(12) United States Patent
Morita et al.

(10) Patent No.: US 8,777,478 B2
(45) Date of Patent: Jul. 15, 2014

(54) MIXING HEAD APPARATUS FOR HIGH AGITATION AND SMOOTH FLOW OF LIQUID BLEND AND MOLDING METHOD USING THE SAME

(75) Inventors: Haruo Morita, Aichi (JP); Norishige Kobayashi, Aichi (JP)

(73) Assignee: Inoac Corporation, Nagoya-shi (JP)

( * ) Notice: Subject to any disclaimer, the term of this patent is extended or adjusted under 35 U.S.C. 154(b) by 180 days.

(21) Appl. No.: 13/131,128

(22) PCT Filed: Nov. 27, 2008

(86) PCT No.: PCT/JP2008/071581
§ 371 (c)(1),
(2), (4) Date: Jul. 29, 2011

(87) PCT Pub. No.: WO2010/061464
PCT Pub. Date: Jun. 3, 2010

(65) Prior Publication Data
US 2012/0013035 A1    Jan. 19, 2012

(51) Int. Cl.
*B29B 7/76* (2006.01)
(52) U.S. Cl.
USPC ............. 366/162.4; 366/162.5; 422/133
(58) Field of Classification Search
USPC ............ 366/138, 159.1, 162.4–162.5, 167.1, 366/173.1; 422/131, 133–135; 239/418, 239/422, 426, 428, 433, 434
See application file for complete search history.

(56) References Cited

U.S. PATENT DOCUMENTS 2,719,584 A * 10/1955 Winslow ................. 239/424
3,912,234 A * 10/1975 Peter
4,090,695 A    5/1978 Stone et al.
4,126,399 A * 11/1978 Schneider et al.

(Continued)

FOREIGN PATENT DOCUMENTS

JP    49 128366    12/1974
JP    02107322 A  *  4/1990  ............... B01F 5/00

(Continued)

OTHER PUBLICATIONS

International Search Report issued Mar. 3, 2009 in PCT/JP08/71581 filed Nov. 27, 2008.

(Continued)

*Primary Examiner* — Charles Cooley
(74) *Attorney, Agent, or Firm* — Oblon, Spivak, McClelland, Maier & Neustadt, L.L.P.

(57) ABSTRACT

The present invention provides a low-cost and highly productive mixing head apparatus that achieves high agitation of a liquid blend and improves the smooth flow of the liquid blend from a discharge port, and a molding method using the same. In the mixing head apparatus wherein two types of chemically reactive fluid component materials 5 are expelled into a chamber interior 10 from fine holes respectively provided in side walls 11 of the chamber so that both component materials 5 impinge on and mix with each other, a plurality ranging from two to four of fine holes 30 are provided for at least one of both component materials 5, center axis lines 35 at distal ends of two or more of the two to four fine holes 30 intersecting with each other in the chamber interior 10, so that jets 50 of the component material expelled from the fine holes 30 with intersecting center axis lines impinge on each other in the chamber interior 10 prior to impingement with the other component material.

7 Claims, 16 Drawing Sheets

(56) References Cited

U.S. PATENT DOCUMENTS

| | | |
|---|---|---|
| 4,399,104 A | 8/1983 | Coblenz et al. |
| 4,448,902 A | 5/1984 | Coblenz et al. |
| 5,082,633 A * | 1/1992 | Stuper .......................... 422/133 |
| 5,093,084 A * | 3/1992 | Boden et al. .................. 422/133 |
| 2003/0150624 A1 * | 8/2003 | Rummel ........................ 169/43 |

FOREIGN PATENT DOCUMENTS

| | | | |
|---|---|---|---|
| JP | 04 093204 | 3/1992 | |
| JP | 04093205 A * | 3/1992 | ............... B29B 7/76 |
| JP | 07144122 A * | 6/1995 | ............... B01F 5/00 |
| JP | 2003 299939 | 10/2003 | |
| JP | 2008 307721 | 12/2008 | |

OTHER PUBLICATIONS

Office Action issued May 22, 2013 in Chinese patent application No. 200880132003.3 filed on Nov. 27, 2008 (with English Translation).

Extended European Search Report Issued Apr. 17, 2013 in Patent Application No. 08878421.0.

Office Action dated Oct. 28, 2013, in corresponding European Application No. 08 878 421.0.

Office Action mailing dated Jan. 7, 2014, in Japanese Patent Application No. 2010-540268 with English translation.

* cited by examiner (a)

(b)

(a)                    (b)

MIXING HEAD APPARATUS FOR HIGH AGITATION AND SMOOTH FLOW OF LIQUID BLEND AND MOLDING METHOD USING THE SAME

TECHNICAL FIELD

The present invention relates to a mixing head apparatus for agitating and mixing two types of chemically reactive component materials of polyurethane foam or the like and a molding method using the same.

BACKGROUND ART

A high-pressure mixing head apparatus is sometimes used for formation of, for example, polyurethane foam. Conventionally, there existed a mixing head apparatus with a fixed nozzle design such as the one shown in FIG. 21. FIG. 22 shows a detailed view of a lower part of FIG. 21. In the mixing apparatus of FIGS. 21 and 22, one 5a and the other 5b of two types of chemically reactive component materials 5a and 5b are expelled at high pressure using plungers into a chamber interior 10 from nozzle outlets 80 respectively provided in opposite side walls 11 of the chamber 1 so that both component materials 5a and 5b impinge on and mix with each other. Reference numeral W denotes the point of impingement, 8 denotes nozzle members, 2 denotes an injection piston, and OL denotes oil for the injection piston. A liquid blend 6 (fluid mix) composed of two types of component materials 5 mixed together is discharged from a discharge unit 13 at the bottom of the apparatus into a mold (not shown) so that it is molded and foamed inside the mold.

Accordingly, desirable requirements for the mixing head apparatus were that: (1) the liquid blend 6 is well agitated; and (2) the liquid blend 6 is discharged from a discharge port 14 uniformly and smoothly at a measured blend ratio without scattering or splashing at the start of discharge (hereinafter referred to as "smooth flow"). Attempts have been made to raise the speed of materials traveling through nozzles to obtain a well-agitated liquid blend, which, however, increases the load imposed on the apparatus due to higher pressure of the pump. Also, there is a limit to the pump pressure and an attempt to further increase agitation leads to difficulties in obtaining the smooth flow. Any redundant energy remaining in the liquid blend 6 when it is discharged from the discharge port 14 of the mixing head apparatus makes it difficult to obtain a smooth flow of the liquid blend 6.

For these reasons, to solve such problems, apparatuses shown in FIGS. 23 and 24, or an improved apparatus according to an invention entitled "Apparatus for injecting fluid raw materials of plastic foam", or an improved apparatus according to an invention entitled "Improved impingement mixing type mixing module" have been proposed so far (see Patent Documents 1 and 2).

Patent Document 1: Japanese Laid-Open Patent Application Publication No. 2003-299939

Patent Document 2: Japanese Laid-Open Patent Application Publication No. 1992-093204

DISCLOSURE OF THE INVENTION

Problems to be Solved by the Invention

However, the apparatuses of FIGS. 23 and 24 had the following problems. The apparatus of FIG. 23 includes baffle pins 91 in the downstream of the chamber interior 10 for the liquid blend 6 after the impingement of both component materials 5a and 5b to flow therebetween to increase the degree of mixing as well as to achieve a smooth flow. For this, however, a complex mechanism had to be incorporated. Namely, in production of polyurethane foam where high-viscosity component materials 5 are handled, after mixing both component materials 5a and 5b by impingement and discharging the blend, inner walls 11 of the chamber needed to be cleaned by lowering the injection piston 2. The baffle pins 91, therefore, had to be retracted every time, which would cause an increase in the cost of the apparatus. In addition, the production process involved two steps as compared to the single step of FIG. 21, which would affect productivity.

In the apparatus of FIG. 24, both component materials 5a and 5b impinge on each other at an impingement point W from where streams flow in a horizontal direction and are collided against an inner wall surface Q to promote secondary agitation as well as to remove kinetic energy to achieve a smooth flow. This structure would become complex as well and increase the cost of the apparatus. The production process involved coordination of the operation of the injection piston 2 and that of a cleaning member 92, and, in addition, required cleaning of the inner wall using a rod 921, which would affect productivity.

The invention of Patent Document 1 noted above relates to a technique defined as "an apparatus for injecting fluid raw materials of plastic foam, including a head part where fluid raw materials of plastic foam are mixed, and a nozzle connected to a distal end of this head part for discharging the fluid raw materials of plastic foam, wherein the fluid raw materials of plastic foam discharged from this nozzle is impinged on an impingement portion provided to the nozzle", which had a drawback that mixing was not achieved sufficiently. Namely, the fluid is impinged on the impingement portion to promote secondary agitation as well as to remove kinetic energy to achieve a smooth flow, but the drawback was that the mixing would be insufficient due to the structure for causing impingement being simplified.

The invention of Patent Document 2 noted above relates to a technique defined as "an impingement mixing type mixing module in an impingement mixing apparatus in which a liquid A and a liquid B that are raw materials of plastics such as urethane, epoxy, unsaturated polyester are forced out from outlets and mixed together by an impingement mixing method, the module being a one-piece molded module and forming a mixing chamber part where the two liquids are impinged on each other, the module including two or more outlets (orifices) respectively for the liquid A and liquid B, one or both of the liquid A and liquid B being forced out linearly toward a center of the mixing chamber, the liquid A and liquid B being forced out into the mixing chamber at such angles that the two liquids directly impinge on each other", which had a drawback that mixing was not achieved sufficiently. Since the two liquids forced out from two or more outlets are directly impinged on each other merely at a predetermined angle, the two liquids may not be sufficiently mixed together, because of which variations of product properties were hardly resolved.

FIG. 25 shows a schematic view of the outer shape of a product obtained by one experimental method. A horizontally moving belt was installed below a discharge unit 13 of a mixing head apparatus, and a liquid blend 6 (fluid mix) after both component materials 5a and 5b have been impinged on each other was poured out of the discharge unit 13 onto this belt. The drawing is a schematic illustration of the outer shape of a cured product, i.e., the outer shape from a first discharged head portion through a body to a tail portion at the end. FIG.

26 shows the outer shape of a product obtained using the conventional apparatus of FIG. 21. Insufficient mixing by impingement, or an unsatisfactory smooth flow of liquid blend 6 after the mixing would lead to inferior quality of the product as shown in FIG. 26, where defects such as burrs and voids were observed in a head portion formed at the start of discharge (corresponding to the right side portion in FIG. 26).

Meanwhile, a high-pressure injector has a configuration in which, when component materials are not being introduced, side walls of a cylinder are closing the nozzle outlets so that the component materials that have flowed into fine holes of the nozzles are returned again to a tank to be circulated. After the injection and discharge, the piston goes up inside the chamber to an upper limit of its stroke. When the piston goes up through the outlet nozzles, component materials such as a polyol component, isocyanate, and other additives, are immediately introduced from the nozzles at high pressure into the chamber. The component materials expelled from the nozzles into the chamber are mixed and agitated by impingement, and when the chamber is full, are discharged from a discharge port at a lower part of the chamber by the force of gravity.

After a predetermined amount of component materials is discharged for a certain period of time, the piston noted above moves down. The piston shuts the nozzles as it goes down to a lower limit of its stroke. In such a series of operations of the injector, side walls of the cylinder are cleaned by the piston rod moving up and down to remove reactive mixture of component materials adhered thereon, but only to a limited extent. Such reactive mixture may harden by a chemical reaction and form a foreign substance (contamination), which may possibly be circulated to the tank together with the component materials.

Moreover, it has been observed that foreign substances accumulate and build up in spots where materials stagnate in the circulation path from the tank to the chamber.

Accordingly, in mass production of products using a high-pressure injector, a foreign substance composed of a urethane plastic may develop and build up for some reason, which may make the flow amount or pressure loss unstable. For this reason, variations in the flow amount or pressure loss may sometimes be resolved by flushing out any such foreign substance so that it does not clog up the nozzles.

In particular, a high-pressure injector having a structure in which a nozzle member is assembled into a nozzle holder may sometimes adopt a nozzle designed such that, since the nozzle member is small, the nozzle member is designed to include a recess 33 in a surface on a material inlet side with a through hole 30 provided in this recess 33 so that the through hole 30 can be made shorter and that it can be formed more easily (see FIG. 4). In such a case, the contamination noted above tends to accumulate and build up in the recess 33 noted above. This sometimes results in nozzle clogging. While the total cross-sectional area of fine hole(s) of the nozzle is substantially the same whether there is one hole or two holes, if the nozzle has plural fine holes, each fine hole will have a smaller cross-sectional area, because of which such fine holes are more readily clogged up even if the foreign substance is of the same size.

The present invention solves the above problems and is directed to providing a low-cost and highly productive mixing head apparatus which achieves high agitation of a liquid blend and improves the smooth flow of the liquid blend from a discharge port, and a method of molding a two-component plastic product using the same. Another object of the present invention, in addition to the above object, is to provide a mixing head apparatus that can smoothly flush out any foreign substance that may be formed such as polyurethane residue to prevent clogging of nozzles, and a method of molding a two-component plastic product using the same.

Means for Solving the Problems

The present invention is as follows:

1. A mixing head apparatus in which two types of chemically reactive fluid component materials are expelled into a chamber interior from fine holes respectively provided in side walls of a chamber so that both component materials impinge on and mix with each other, wherein
a plurality ranging from two to four of fine holes are provided for at least one of the component materials, center axis lines at distal ends of two or more of these two to four fine holes intersecting with each other in the chamber interior, so that jets of the component material expelled from the fine holes with intersecting center axis lines impinge on each other in the chamber interior prior to impingement with the other component material.

2. The mixing head apparatus according to 1 above, wherein a nozzle part is detachably secured to a wall hole portion provided in a side wall of the chamber, the nozzle part being formed with the fine holes.

3. The mixing head apparatus according to 2 above, wherein the fine hole includes a conical hole portion opening on a material inlet side of the nozzle part and tapering toward the chamber interior, and a distal end hole portion extending from a tapered end of the conical hole portion toward the chamber interior and opening to the chamber interior.

4. The mixing head apparatus according to 2 or 3 above, wherein the nozzle part is formed with two fine holes, center axis lines of both fine holes intersecting with each other with a crossing angle ($\theta$) within a range from 30 to 90°.

5. The mixing head apparatus according to 4 above, wherein the two fine holes are respectively disposed along a vertical direction of the chamber.

6. A molding method using a mixing head apparatus in which one and the other of two types of chemically reactive fluid component materials are expelled into a chamber interior from fine holes respectively provided in side walls of a chamber so that both component materials impinge on and mix with each other, a plurality ranging from two to four of fine holes being provided for at least one of the component materials, center axis lines at distal ends of two or more of these two to four fine holes intersecting with each other in the chamber interior, so that jets of the component material expelled from the fine holes with intersecting center axis lines impinge on each other in the chamber interior, wherein one of the both component materials is made to impinge on itself, followed by impingement with the other component material to mix both component materials together, which are then discharged into a mold and cured.

7. The molding method using the mixing head apparatus according to 6 above, wherein the fine hole includes a conical hole portion tapering toward the chamber interior, and a distal end hole portion extending from a tapered end of the conical hole portion toward the chamber interior and opening to the chamber interior.

8. The molding method using the mixing head apparatus according to 7 above, wherein the two types of chemically reactive component materials are component materials containing a polyol component and an isocyanate component for a two-component polyurethane resin.

9. The molding method using the mixing head apparatus according to any one of 6 to 8 above, wherein the at least two fine holes are respectively disposed along a vertical direction of the chamber.

Here, the term "chamber" refers to any and all spaces into which component materials are expelled and in which they are mixed and agitated. The term "self impingement" refers to a condition in which one type of fluid component material is expelled from two or more fine holes as jets, and these jets impinge on each other by intersecting with each other.

Effects of the Invention

According to the mixing head apparatus and the molding method using the same of the present invention, fine holes are provided in a range from two to four for at least one of both component materials, and the center axis lines at the distal ends of at least two of these fine holes are made to intersect with each other inside the chamber, so that at least one component material is atomized by self impingement, which enhances mixing and contact efficiency of component materials. Thereby, high agitation of a liquid blend and a smooth flow of the liquid blend from the discharge port can be achieved easily and reliably, and thus excellent effects are achieved at low cost for improvement of productivity and product quality, etc.

If the fine hole includes a conical hole portion tapering toward the chamber interior and a distal end hole portion extending from the tapered end of this conical hole portion toward the chamber interior and opening to the chamber interior, the fine hole can be primarily configured by a smooth curved surface with these conical hole portion and distal end hole portion where fluid traps are hardly formed, so that any foreign substance that may be formed such as polyurethane residue can be smoothly flushed out while it is still minute and nozzle clogging can be prevented, which further enhances mixing and contact efficiency of the component materials.

Further, if at least two fine holes are respectively arranged along a vertical direction of the chamber, then at least one atomized component material spreads out in a horizontal direction relative to the vertical direction of the chamber after the impingement with the other component material, so that the atomized component material can be prevented from adhering on the push-out side of the piston positioned at the ceiling of the chamber, which further enhances mixing and contact efficiency of the component materials.

Figure 1:
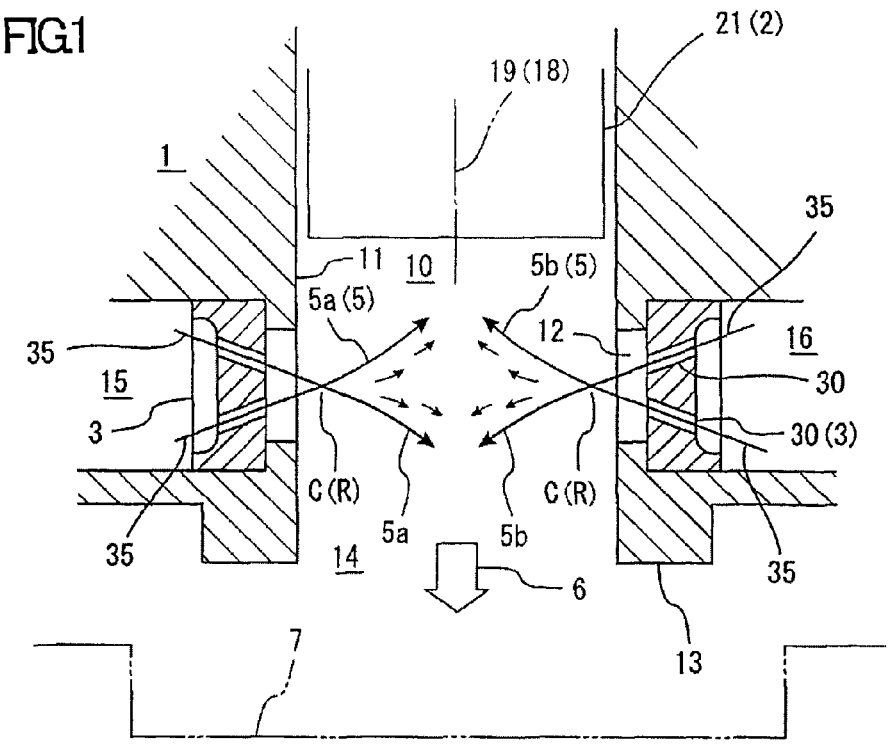
FIG. 1 is a schematic longitudinal sectional view showing a lower part of a mixing head apparatus in one aspect of the present invention.

DESCRIPTION OF REFERENCE NUMERALS 1 chamber
10 chamber interior
11 side wall
18 center
19 center axis (center)
3 nozzle part 70 nozzle part
73 conical hole portion
74 distal end hole portion
30 fine hole
5 component material
5a one component material
5a the other component material
7 mold (metal mold)

BEST MODES FOR CARRYING OUT THE INVENTION

Embodiment 1

Figure 2:
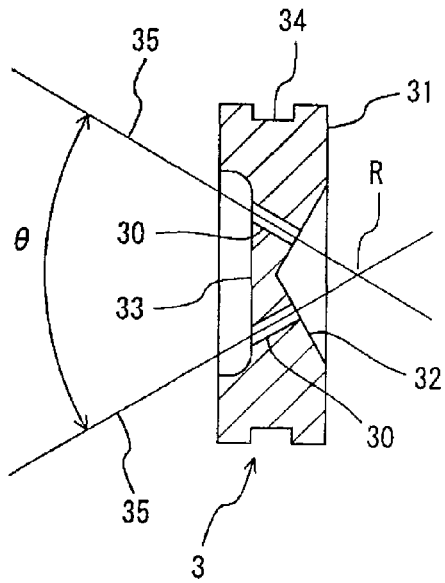
FIG. 2(a) is a longitudinal sectional view of a nozzle part of FIG. 1.
FIG. 2(b) is a right side view of FIG. 2(a).
Figure 2:
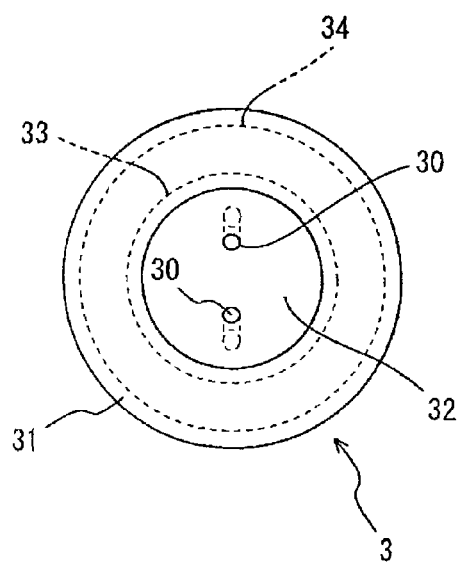
Figure 3:
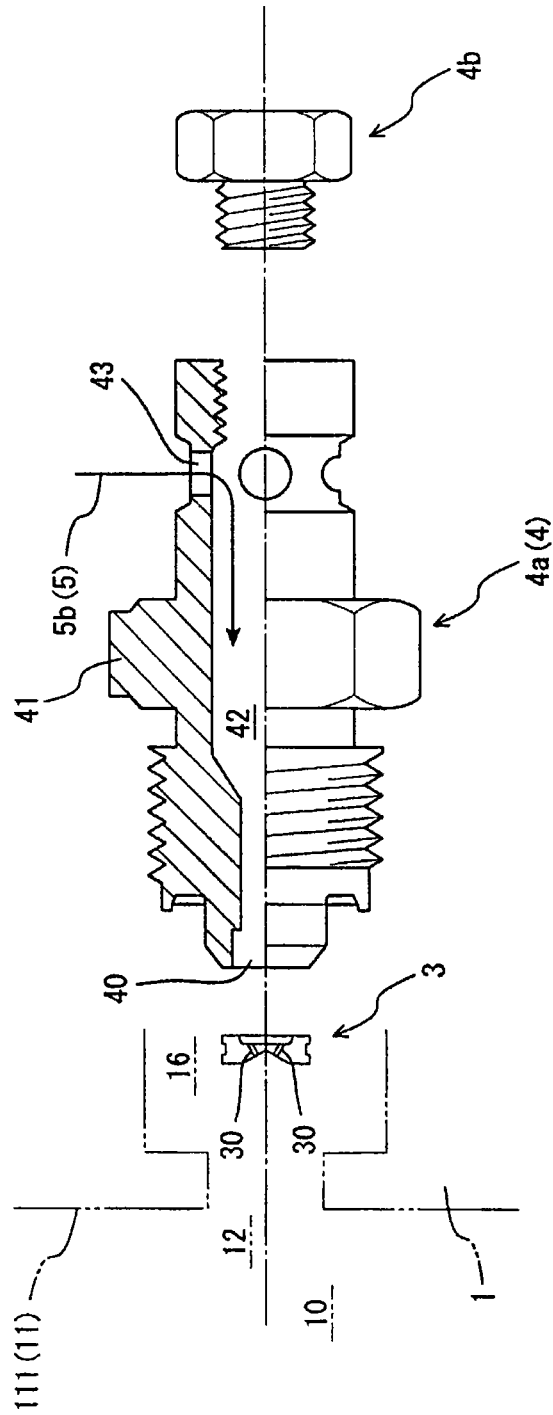
FIG. 3 is an exploded illustrative view showing how the nozzle part and a nozzle holder are mounted to a wall hole in the chamber of FIG. 1.
Figure 4:
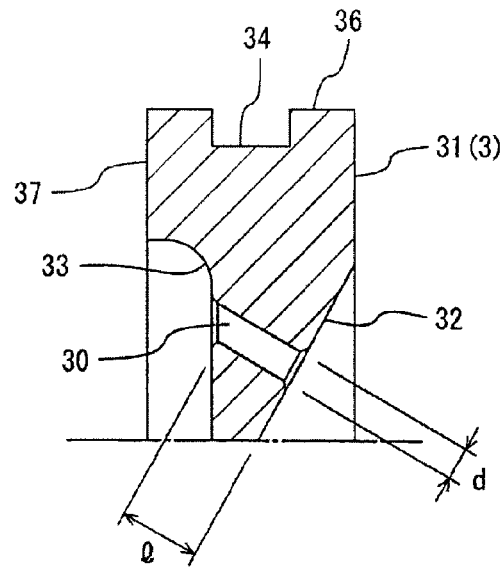
FIG. 4 is a partial enlarged view of the nozzle part of FIG. 2(a).
Figure 5:
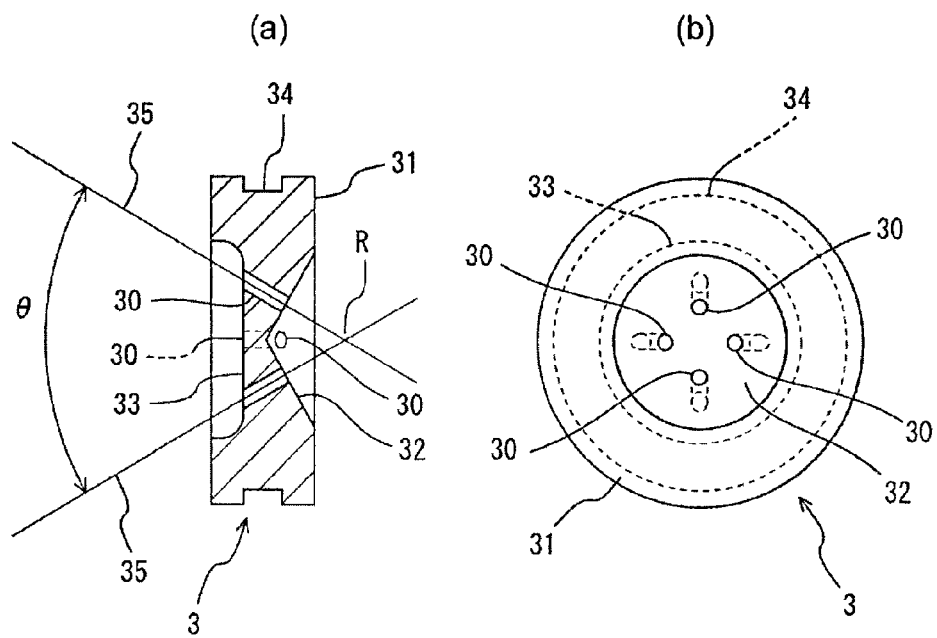
FIG. 5(a) is a longitudinal sectional view of a nozzle part in a different aspect from the nozzle part of FIG. 2.
FIG. 5(b) is a right side view of FIG. 5(a).
Figure 6:
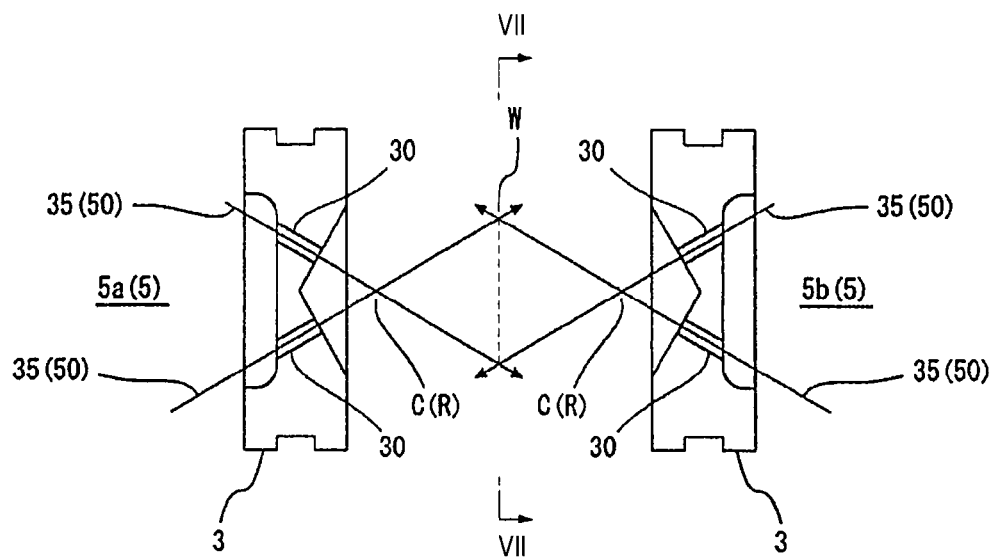
FIG. 6 is an illustrative view showing the positional relationship between nozzle parts mounted to opposite side walls of the chamber of the mixing head apparatus.
Figure 7:
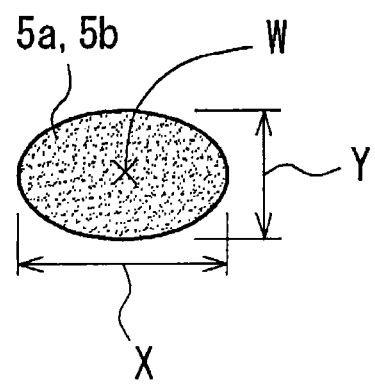
FIG. 7 is a diagram viewed from the direction of arrows along the line VII-VII of FIG. 6, showing an approximate shape of an impingement surface formed when jets of both component materials expelled from fine holes of the nozzle parts of FIG. 6 impinge on each other.
Figure 8:
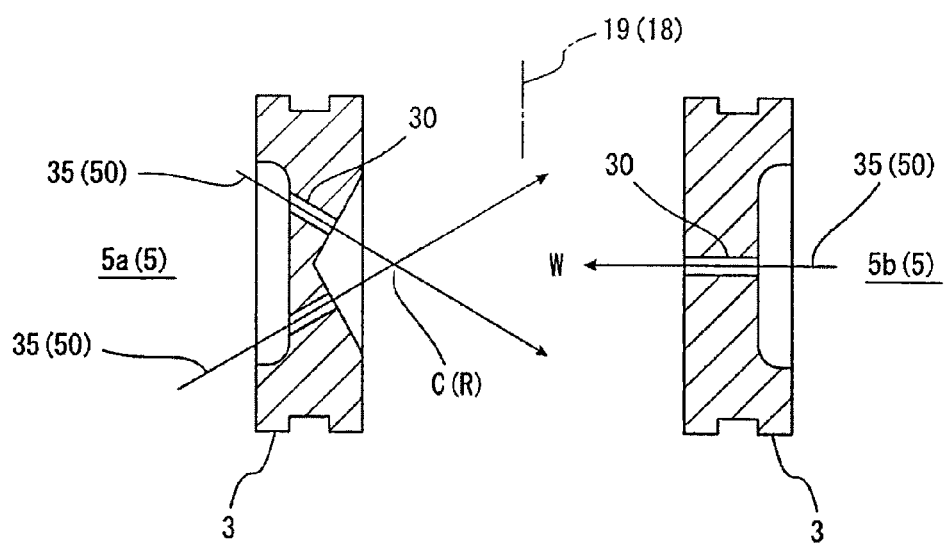
FIG. 8 is an illustrative view showing the positional relationship between nozzle parts mounted to opposite side walls of the chamber of a mixing apparatus, in a different aspect from that of FIG. 6.

Embodiment 1 of a mixing head apparatus and a molding method using the same according to the present invention will be hereinafter described in detail. FIGS. 1 to 11 illustrate one aspect of the mixing head apparatus (hereinafter referred to as "mixing apparatus") and the molding method using the same according to the present invention. FIG. 1 is a schematic longitudinal sectional view of a lower part of the mixing apparatus, FIG. 2(a) is a longitudinal sectional view of a nozzle part of FIG. 1, and FIG. 2(b) is a right side view of FIG. 2(a). FIG. 3 is an exploded illustrative view showing how the nozzle part and a nozzle holder are mounted to a wall hole in the chamber of FIG. 1, FIG. 4 is a partial enlarged view of the nozzle part of FIG. 2(a), FIG. 5 is a right side view of a longitudinal sectional view (a) of a nozzle part in a different aspect from the nozzle part of FIG. 2, FIG. 6 is an illustrative view showing the positional relationship between nozzle parts mounted to opposite side walls of the chamber of the mixing apparatus, and FIG. 7 is a diagram viewed from the direction of arrows along the line VII-VII of FIG. 6, showing an approximate shape of an impingement surface formed when jets of both component materials expelled from fine holes of the nozzle parts of FIG. 6 impinge on each other. FIG. 8 is an illustrative view showing the positional relationship between nozzle parts mounted to opposite side walls of the chamber of a mixing apparatus, in a different aspect from that of FIG. 6, and FIGS. 9 to 11 are processed images of the outer appearance of test products obtained using this mixing head apparatus. For ease of understanding of the drawing, hatching indicating cross sections of the nozzle part are omitted in FIG. 3.

Figure 21:
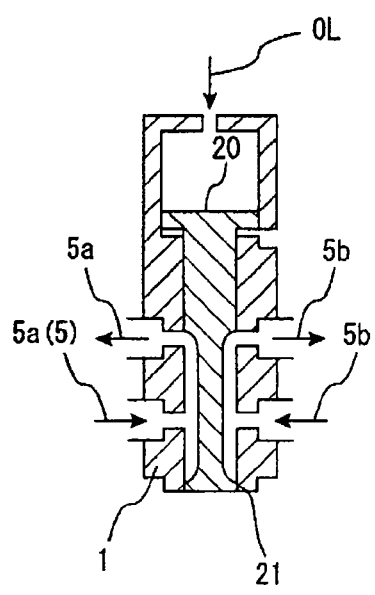
FIG. 21 is an illustrative sectional view of a conventional technique.
Figure 21:
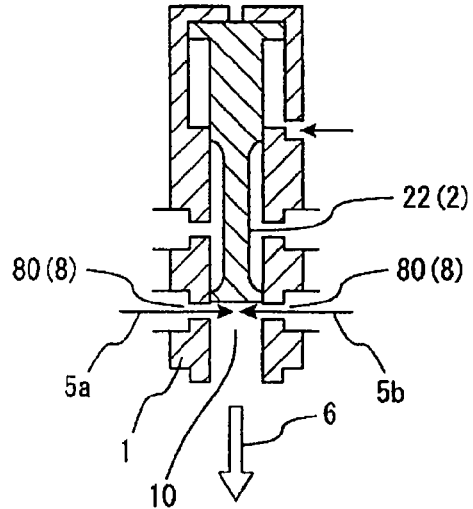
Figure 22:
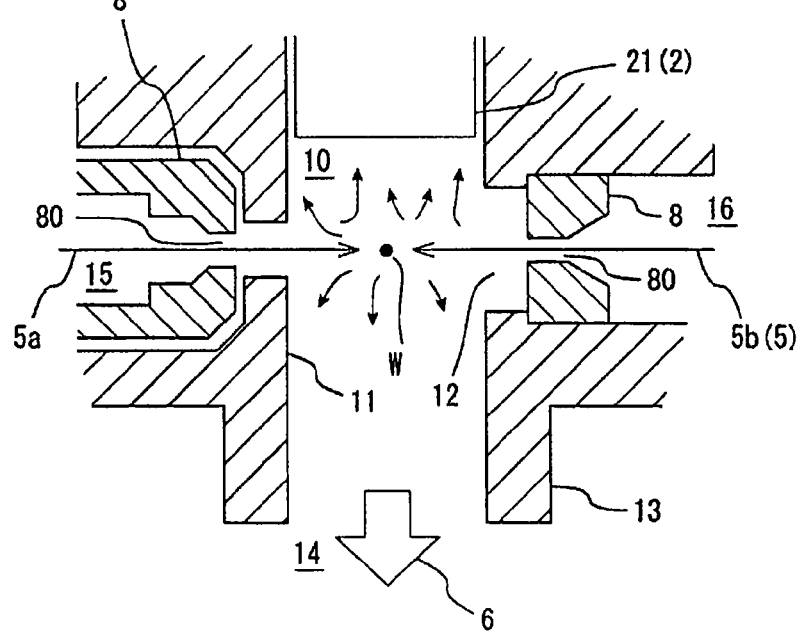
FIG. 22 is an enlarged view of essential parts of FIG. 21.

The basic structure of the mixing apparatus of the present invention is substantially the same as that of the conventional mixing apparatus shown in FIGS. 21 and 22. It is a mixing apparatus, in which one 5a and the other 5b of two types of chemically reactive fluid component materials 5 are expelled into a chamber interior 10 from fine holes 30 respectively provided in opposite side walls 11 of the chamber 1 so that both component materials 5a and 5b impinge on and mix with each other. Typically, such a high-pressure mixing apparatus does not depend on cleaning with a solvent and instead employs a mechanical cleaning method using an injection piston 2 such as the one shown in FIG. 21. FIG. 1 corresponds to an enlarged longitudinal sectional view of a lower part of the mixing apparatus of FIG. 21, and similarly to FIG. 21, an injection piston 2 is provided. A liquid blend 6 obtained through impingement and mixture of both component materials 5a and 5b in the chamber interior 10 is discharged from a discharge port 14 into a mold 7, after which the piston moves up and down so that the inner walls 11 of the chamber after the impingement and mixture of both component materials 5a and 5b are cleaned by a rod part 21 of the injection piston 2.

Figure 23:
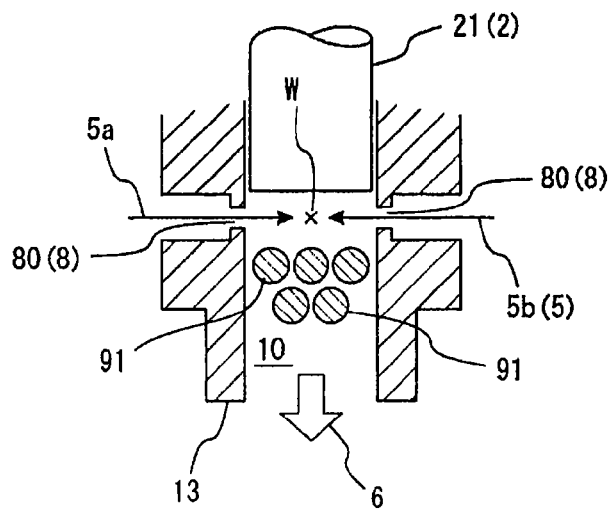
FIG. 23 is an illustrative sectional view of a conventional technique.
Figure 24:
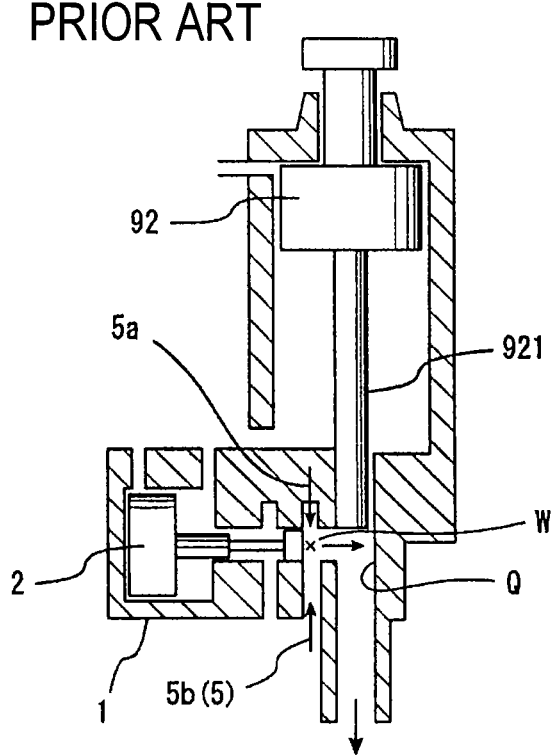
FIG. 24 is an illustrative sectional view of a conventional technique.

It should be pointed out here that, in the conventional mixing apparatus, when mixing both component materials 5a and 5b by expelling them from the fine holes 30, to achieve a higher degree of mixing, the speed of jets of both component materials 5a and 5b was increased to impart high energy so that the components impinge on one another and are thereby agitated and mixed together. To increase the speed and to impart high energy, the conventional mixing apparatus would have one each fine hole 30 for one component material and for the other component material, respectively provided in the opposite side walls 11 of the chamber 1. The mixing apparatus of FIGS. 21 and 22 with nozzle outlets 80 for fine holes, or the mixing apparatuses of FIGS. 23 and 24 respectively had one each nozzle outlet 80 for one component material and for the other component material provided in the opposite side walls. The intention was to expel both component materials from both nozzle outlets 80 with high energy at high pressure by plungers or the like so that they impinge on one another and are agitated and mixed together.

In this regard, in order to achieve a smooth flow of liquid blend 6 and better mixing performance, the present inventors looked at the issue from a different point of view and conceived of a possibility of improving the degree of mixing by planar impingement rather than point impingement as shown in FIGS. 21 to 24 of both plastic materials 5a and 5b when mixing two types of chemically reactive component materials 5 by impingement, and endeavored to develop a technique. That eventually led to the mixing apparatus and molding method using the same of the present invention. It was ascertained through experiments that the degree of mixing of both component materials 5a and 5b was increased, and the smooth flow effect of liquid blend 6 was achieved.

In this mixing apparatus, a plurality ranging from two to four of fine holes 30 are provided for at least one of both component materials 5a and 5b. Center axis lines 35 at distal ends of two or more of these two to four fine holes 30 intersect with each other in the chamber interior 10. That is, center axis lines 35 of two, three, or four fine holes 30 intersect with each other in the chamber interior 10. The center axis lines 35 are set such that jets of one component material 5a expelled from the fine holes 30 with intersecting center axis lines 35 intersect and impinge on each other in the chamber interior 10 prior to the impingement with the other component material 5b. Also, the intersecting point R of the center axis lines 35 of two or more of the two to four fine holes 30 in the chamber interior 10 is set closer to a chamber inner wall 11 on the side of these fine holes 30 relative to the center of the chamber 1 in plan view or side view, so as to ensure the self impingement in the chamber interior 10 prior to the impingement with the other component material 5. Intersection and self impingement of one component material 5 in the chamber interior 10 prior to the impingement with the other component material 5 transform the one component material 5 into a dispersed state (atomized state). With at least one component material 5 impinging on the other component material 5 after transforming into the dispersed state in which it is spread out in a planar manner, the degree of mixing and contact efficiency of both component materials 5a and 5b expelled from opposite directions in the chamber interior 10 are significantly increased. At the same time, with an increase in the degree of mixing of both component materials 5a and 5b, the component materials 5 lose energy so that a smooth flow of liquid blend 6 is achieved.

The reason for setting the limitation that "a plurality ranging from two to four of fine holes 30 are provided" is that, providing more than four fine holes 30 would necessitate reducing their diameter, which would proportionally increase the possibility of impurities or aggregates clogging up the nozzle. A preferable number of fine holes 30 provided for each component material is two. For example, the phrase "center axis lines 35 at distal ends of two fine holes 30 intersecting with each other in the chamber interior 10", which falls within the definition of "center axis lines 35 at distal ends of two or more of these two to four fine holes 30 intersecting with each other in the chamber interior 10" of the statement above of the present invention, should be understood to include not only the center axis lines 35 at distal ends of two fine holes 30 definitely intersecting with each other within a geometrical three-dimensional space, but also the center axis lines 35 slightly offsetting and not intersecting with each other in the chamber interior 10. If the jets of a component material 5 expelled from two fine holes 30 intersect with each other and substantially impinge on each other, the center axis lines 35 of the two fine holes 30 are interpreted as intersecting with each other in the chamber interior 10. Fluid component materials 5 contain high-viscosity plastic materials expelled from fine holes 30, which form thin, linear streams or beams, but if the jets 50 of both component materials 5a and 5b intersect and impinge on each other, they provide similar effects as those described above. The degree of mixing of both component materials 5a and 5b will then be increased, i.e., high agitation and a smooth flow will both be achieved.

More specifically, while both component materials 5a and 5b were impinged on one another at a point in the conventional apparatuses of FIGS. 21 to 24, two fine holes 30 are provided, for example, for at least one component material, and the center axis lines 35 of these two fine holes 30 are intersected with each other in the chamber interior 10, so that two jets 50 of one component material expelled from both fine holes 30 intersect and impinge on each other in the chamber interior 10 prior to the impingement with the other component material 5. Thereby, one component material 5 is spread out in a planar manner at a point where the other component material 5 impinges thereon so that a high degree of mixing is achieved. If a plurality ranging from two to four of fine holes 30 are provided for both component materials 5, and further, if center axis lines 35 at distal ends of at least two of the plurality of fine holes 30 are intersected with each other in the chamber interior 10, both component materials 5 will be spread out in a planar manner at the point of impingement between both component materials 5a and 5b, whereby even a higher degree of mixing will be achieved. If the two types of chemically reactive component materials 5a and 5b are component materials containing a polyol component and an isocyanate component for a two-component polyurethane plastic, the fine hole 30 for the component material containing an isocyanate component only may be provided in plurality ranging from two to four. Even with plural fine holes 30 for the isocyanate component only, an equally high degree of mixing can be achieved as would be if fine holes 30 for both component materials were provided in plurality ranging from two to four.

In the mixing apparatuses of FIGS. 1 and 6, one each nozzle part 3 of FIG. 2 is detachably and securely mounted in both wall holes 12 provided in opposite side walls 11 of the chamber 1, respectively, both nozzle parts 3 respectively being formed with two fine holes 30.

The nozzle part 3 of this Embodiment 1 is formed of a disk-like main part 31 provided with two fine holes 30 extending from the front side facing the chamber interior 10 through to the opposite backside, as shown in FIG. 2. Both fine holes 30 consist of straight axial holes, their center axis lines 35 intersecting with each other with an internal crossing angle θ within a range from 30 to 90°. Further, both fine holes 30 are disposed such that intersecting points R of the center axis lines 35 of both fine holes 30 in the chamber interior 10 are set closer to inner walls 11 of the chamber on the side of these fine holes than to the center (here, center axis 19) of the chamber 1 in side view as shown in FIG. 1 (or in plan view). The length l of the axial holes is determined so as to achieve straightness in the jets 50 of component materials 5 expelled from the fine holes 30, and the diameter d of the fine holes 30 is set so as to achieve a necessary speed of the jets 50 (FIG. 4). In this embodiment, a conical recess 32 is provided on the front side of the nozzle part 3, and two fine holes 30 are provided such as to extend perpendicularly from the surface of this recess through to the backside and to be spaced apart a predetermined distance in the up and down direction, so as to satisfy the two requirements mentioned above of straightness and necessary speed of the jets 50. The reason why the "center axis lines 35 intersect with each other with an internal crossing angle θ within a range from 30 to 90°" is that, if the angle is less than 30°, then both component materials 5a and 5b will not be sufficiently spread out (dispersed) after the impingement. On the other hand, if the angle is more than 90°, it will become hard to form the fine holes 30 satisfying the above-mentioned two requirements in the nozzle part 3, and also the dispersion will be insufficient.

The backside of the nozzle part 3 is formed to have a round bottom 33. The nozzle part 3 is detachably secured to a wall hole portion 12, more specifically, as shown in FIG. 3, a nozzle holder 4 including the nozzle part 3 and a nut 4b are securely screwed into the inner wall 11 around the wall hole 12 and set so that the component material 5 is expelled from the fine holes 30 into the chamber interior 10. With the round bottom being thus formed, the component material 5 is smoothly guided into the fine holes 30 through a conduit 16 (or conduit 15) provided in the chamber 1. FIG. 3 shows how the nozzle part 3 is mounted in a cavity 40 of the nozzle holder 4, which is then secured to the wall hole portion 12. The tip of the nozzle holder 4 with the nozzle part 3 fitted therein is locked by a peripheral projection of the wall hole 12, and the nozzle holder 4 is securely screwed in the chamber wall forming the conduit 16. Thus, the component material 5 travels through the conduit 16 and a through hole 42 from an inlet 43 of the nozzle holder 4 toward the tip thereof so that jets 50 of the component material 5 are expelled into the chamber interior 10 from the fine holes 30 of the nozzle part 3. The reference numeral 34 denotes a ring groove.

FIG. 5 shows a nozzle part 3 in a different aspect from the nozzle part 3 provided with two fine holes 30 as shown in FIGS. 1 to 3. The nozzle part 3 of FIG. 5 includes two more fine holes 30 spaced apart a predetermined distance in the horizontal left and right direction in addition to the two fine holes 30 spaced apart a predetermined distance in the up and down direction of the nozzle part 3 of FIG. 2. The nozzle part 3 is therefore provided with four fine holes 30 with an interval of 90° in the recessed surface around the conical top of the conical recess 32. Although not shown, in the case with three fine holes 30, the nozzle part 3 will have three fine holes 30 provided with an interval of 120° in the recessed surface around the conical top of the conical recess 32.

The nozzle part 3, if it is the one shown in FIG. 2, for example, is attached to the wall hole 12 of the chamber 1 as shown in FIGS. 1 and 6 with the two fine holes 30 positioned up and down. With the two fine holes 30 being attached along the up and down direction (i.e., vertical direction of the chamber or discharging direction of the liquid blend 6), both component materials 5a and 5b spread out in a planar manner and impinge on each other after their self impingement. The impingement surface takes on an oval shape as shown in FIG. 7. This oval shape has a larger horizontal length X than its vertical length Y. With the two fine holes 30 oriented in the up and down direction, it is easier to prevent atomized component materials 5a and 5b from adhering on the push-out side of the piston 2 (see FIG. 1) positioned at the ceiling of the chamber interior 10, than with the two fine holes being oriented in the horizontal direction.

Next, the molding method using this mixing apparatus will be described. The mixing apparatus used here is a mixing apparatus wherein one 5a and the other 5b of two types of chemically reactive fluid component materials 5a and 5b are expelled into a chamber interior 10 from fine holes 30 respectively provided in side walls 11 of the chamber so that both component materials 5a and 5b impinge on and mix with each other, a plurality ranging from two to four of fine holes being provided for at least one of both component materials 5a and 5b, center axis lines 35 at distal ends of two or more of these two to four fine holes 30 intersecting with each other inside the chamber interior 10, so that jets 50 of the component material 5a expelled from the fine holes 30 with intersecting center axis lines 35 impinge on each other in the chamber interior 10. The molding is performed using this mixing apparatus, wherein jets of one 5a of both component materials 5a and 5b are impinged on each other, followed by impingement with the other component material 5b so as to mix both component materials 5a and 5b, after which they are discharged into a mold 7 and cured. If the two types of chemically reactive component materials 5 are component materials containing a polyol component and an isocyanate component for a two-component polyurethane plastic, then high agitation of a reactive liquid blend 6 is achieved and the smooth flow of the liquid blend 6 from the discharge port 14 is improved by using this mixing apparatus, whereby high-quality molded products can be manufactured. If the intersecting point R of the center axis lines 35 at distal ends of two or more of the two to four fine holes 30 in the chamber interior 10 is set closer to the inner wall 11 of the chamber on the side of these fine holes than to the center of the chamber in plan view or side view, the high agitation and smooth flow of the liquid blend 6 can be accomplished with a higher precision, which is more preferable in producing high-quality molded products. If the space containing the wall holes 12 in the side walls 11 of the chamber is considered as a space forming the chamber, or the chamber interior 10, then, depending on the diameter and stroke length of the piston rod 21 and the size of the nozzle member, it may be designed such that an intersecting point R of center axis lines 35 is positioned in the wall holes 12. Further, if at least two fine holes 30 are respectively arranged along the vertical direction of the chamber, then at least one atomized component material 5a spreads out in the horizontal direction relative to the vertical direction of the chamber after the impingement with the other component material 5b, so that the atomized component materials 5a and 5b can be prevented from adhering on the push-out side of the piston 2 positioned at the ceiling of the chamber interior 10 (see FIGS. 1 and 7).

Performance comparison tests were conducted using this mixing apparatus according to the above Embodiment 1, with favorable results, which will be described hereinafter.

[Performance Comparison Test 1]

Table 1 summarizes the results of an experiment using the mixing apparatus according to Embodiment 1. With the number and crossing angle θ of the fine holes 30 provided in the nozzle part 3 being varied, the shapes of the impingement surface of both component materials 5a and 5b spread out in a planar manner and impinging on one another after the one component material 5a and the other component material 5b have undergone self-impingement respectively were examined. After the mixing, the liquid blend 6 was discharged from the discharge unit 13. The splashing of unreacted liquid at the start of the discharge and the condition of the foam of a first discharged portion were also examined.

TABLE 1

Performance Comparison Test of Mixing Head

|  | Comprative Example 1 | Example 1 | Example 2 | Example 3 | Example 4 | Example 5 | Example 6 | Example 7 |
|---|---|---|---|---|---|---|---|---|
| Number of Nozzle | 1 | 2 | 2 | 2 | 2 | 4 | 2 | 2 |
| Outlet Angle | zero | 15 | 30 | 45 | 45 | 45 | 10 | 50 |
| Outlet Diameter |  | 0.7 | 0.4 | 0.7 | 1.0 | 0.5 | 0.7 | 0.7 |
| Nozzle of the Present Invention | none | polyol/ isocyanate | polyol/ isocyanate | polyol/ isocyanate | isocyanate | polyol | polyol/ isocyanate | polyol/ isocyanate |
| Droplet Shape |  | oval | oval | circular | circular | circular | oval | oval |
| Splashing of Unreacted Liquid at the Start of Discharge | present | none | none | none | none | none | none | none |
| Condition of Foam of First Discharged Portion | curing failure observed | good | good | good | good | good | slightly bad | curing failure observed |

In Table 1, the two types of chemically reactive component materials 5 used here are component materials containing a polyol component and an isocyanate component for a two-component polyurethane plastic. For the isocyanate component material, a blend product of toluene diisocyanate TDI-80 (with a viscosity of 3 cps at 25° C.) and polymeric MDI (with a viscosity of 100 to 3000 at 25° C.) was used. For the polyol component material, a blend product of polyether polyol and graft polyol was used.

In Table 1, the number of fine holes 30 respectively provided for the isocyanate component material and polyol component material is indicated as "Number of Nozzle". For example, in the column of "Example 1", numeral 2 in "Number of Nozzle" and the term "polyol/isocyanate" in the row of "Nozzle of the Present Invention" indicate that the number of fine holes 30 for the isocyanate component material is two, and the number of fine holes 30 for the polyol component material is two. In the column of "Example 5", numeral 4 in "Number of Nozzle" and the term "polyol" in the row of "Nozzle of the Present Invention" indicate that the number of nozzles (i.e., fine holes) on the polyol side only is four. In this case the number of fine hole 30 on the isocyanate side is one. Where the number of nozzle is indicated as four, the nozzle has four fine holes 30 with an interval of 90° up and down and left and right in the recessed surface around the conical top of the conical recess 32 as shown in FIG. 5. The outlet angle in Table 1 indicates an elevation angle from a horizontal line to a center axis line 35 of an upper fine hole 30, the horizontal line passing through the intersecting point R of the center axis lines 35 of the upper and lower fine holes 30. It corresponds to one half of the crossing angle θ. In Table 1, the shape on the impingement surface of both component materials is indicated as "Droplet Shape". A transparent acrylic plastic lens was set in the chamber interior 10 to video-tape and observe the "Droplet Shape".

With "Number of Nozzle", i.e., the number of fine holes 30 being two or four so that jets of one component material expelled from these fine holes impinge on each other inside the chamber prior to the impingement with the other component material, splashing of unreacted liquid at the start of discharge was prevented and the condition of the foam of the first discharged portion was improved. Further, favorable results were obtained with mixing apparatuses with "Outlet Angle" being in the range from 15 to 45°, i.e., the crossing angle θ being in the range from 30 to 90°.

[Performance Comparison Test 2]

Figure 9:
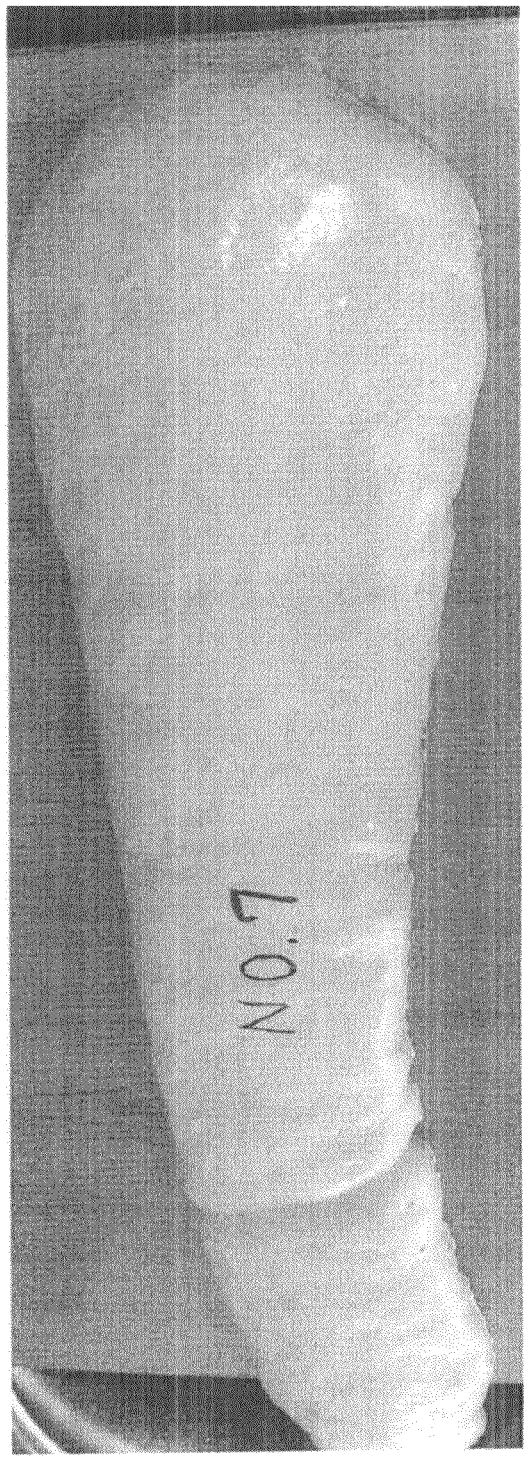
FIG. 9 is a processed image of the outer appearance of a product obtained by pouring a liquid blend from a discharge unit onto a moving belt and curing it in testing in Example 2.
Figure 10:
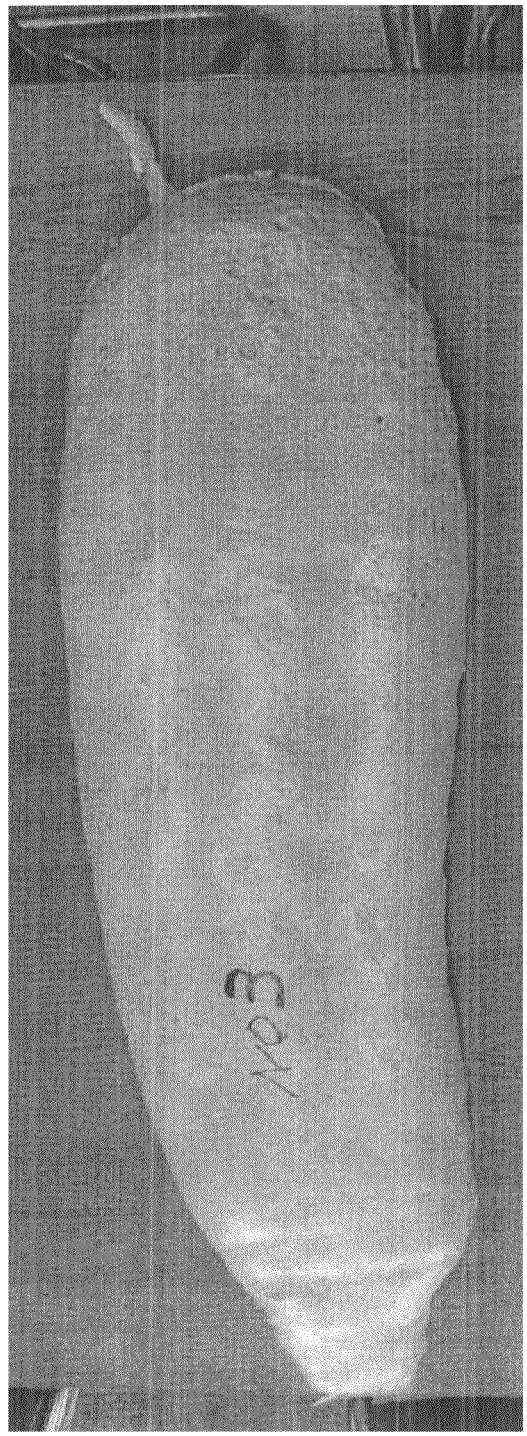
FIG. 10 is a processed image of the outer appearance of a product obtained by pouring a liquid blend from a discharge unit onto a moving belt and curing it under different conditions from those of FIG. 9 in testing in Example 2.
Figure 11:
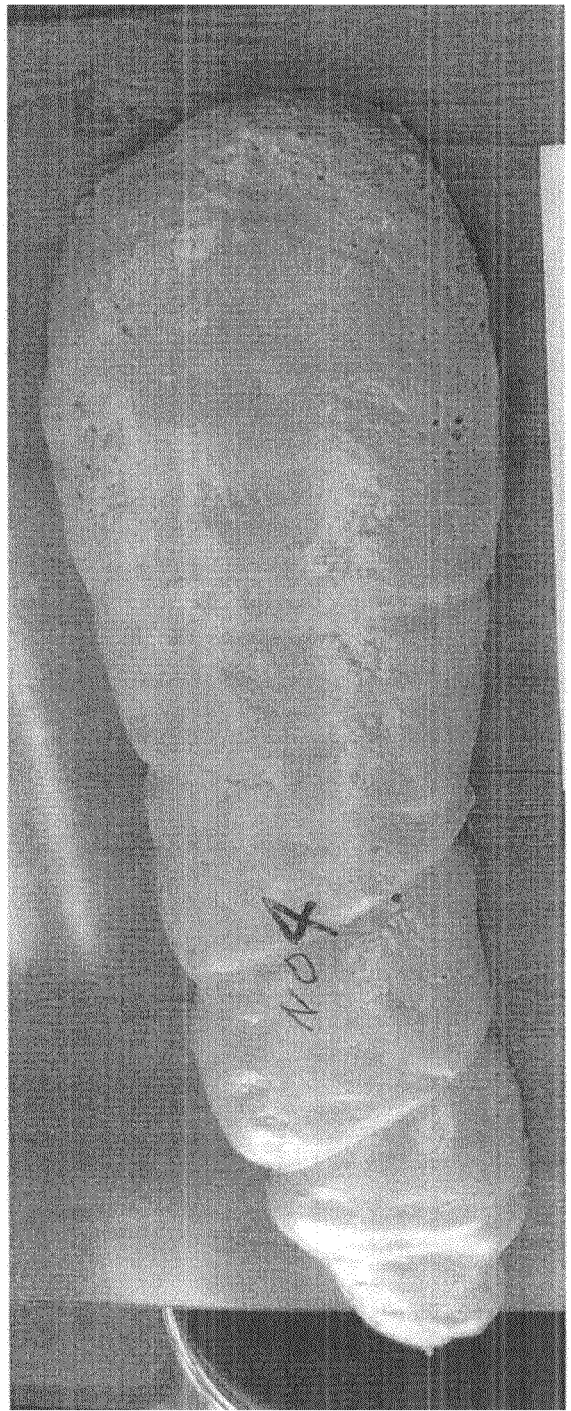
FIG. 11 is a processed image of the outer appearance of a product obtained by pouring a liquid blend from a discharge unit onto a moving belt and curing it under different conditions from those of FIGS. 9 and 10 in testing in Example 2.
Figure 25:
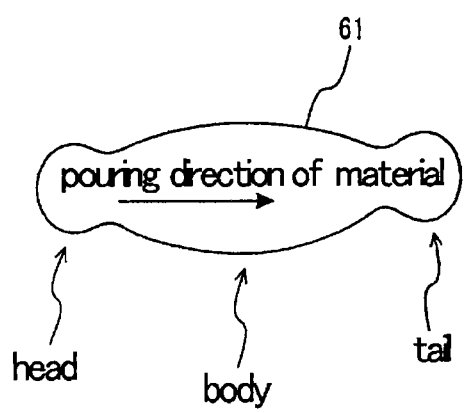
FIG. 25 is an illustrative view of how a product is formed by pouring a liquid blend from a discharge unit onto a moving belt and curing it.
Figure 26:
FIG. 26 is a processed image of the outer appearance of a product corresponding to the one shown in FIG. 25 obtained using a mixing head apparatus with conventional techniques.

A horizontally moving belt was installed below the discharge unit 13 of the mixing apparatus as was described previously in conjunction with FIG. 25, a liquid blend 6 was poured thereonto from the chamber discharge unit 13, and the outer appearance of cured products was examined (FIGS. 9 to 11). As with Embodiment 1, the two types of chemically reactive component materials 5 used here were component materials containing a polyol component and an isocyanate component for a two-component polyurethane plastic. In the mixing apparatus associated with FIG. 9, two fine holes 30 are provided only for the component material containing an isocyanate component, and one fine hole 30 is provided for the component material containing a polyol component. In the mixing apparatuses associated with FIGS. 10 and 11, two fine holes 30 are provided respectively for the component material containing an isocyanate component and for the component material containing a polyol component. Where two fine holes 30 are provided, they are set such that their center axis lines 35 intersect with each other in the chamber interior 10, so that jets of one component material 5 expelled from the fine holes 30 impinge on each other in the chamber interior 10 prior to the impingement with the other component material 5. The crossing angles θ of the center axis lines 35 of both fine holes 30 associated with FIGS. 9 to 11 were all 60°. FIG. 10 shows a case where two each fine holes 30 for isocyanate and polyol were both arranged in the up and down direction, while FIG. 11 shows a case where the two fine holes 30 for isocyanate were arranged in the horizontal direction. In FIGS. 9 to 11, as with FIG. 26, the pouring direction of the material is from the right side toward the left side of the drawing, which is opposite from that of FIG. 25, i.e., the head lies on the right side of the drawing and the tail extends in the left side of the drawing.

In the tests associated with FIGS. 9 to 11 and 26, the amount and pressure of the jets 50 of the component materials 5 expelled from the fine holes 30 are substantially the same. In the conventional mixing apparatus of FIG. 22, one fine hole 80 each is provided for the component material containing an isocyanate component and for the component material containing a polyol component. While there are observed defects such as burrs and voids in the product of FIG. 26, no such defects are found in the products of FIGS. 9 to 11 and they all had an appearance with excellent quality. It was thus ascertained that (1) the liquid blend 6 was well agitated, and (2) a smooth flow of the liquid blend 6 from the discharge port 14 was achieved.

The mixing apparatus thus configured and the molding method using the same are very useful since high agitation of the liquid blend 6 and improvement in the smooth flow of the liquid blend 6 from the discharge port 14 are achieved only by providing a plurality ranging from two to four of fine holes 30 for at least one of both component materials 5a and 5b and by setting the center axis lines 35 at distal ends of at least two of the plurality of fine holes 30 to intersect with each other in the chamber interior 10. Because of the simplicity of this structure, the apparatus cost can be significantly reduced as compared to conventional apparatuses shown in FIGS. 23 and 24. Even with an existing mixing apparatus, high agitation of the liquid blend 6 and improvement in the smooth flow of the liquid blend 6 from the discharge port 14 can be achieved easily only by replacing the nozzle member 8 with this nozzle part 3, which is interchangeable therewith. In addition, the apparatus is excellent in productivity as it does not involve redundant operation steps of the reciprocating baffle pins 91 or cleaning member 92 of FIGS. 23 and 24. It goes without saying that the configuration of the present invention added to the apparatuses of FIGS. 23 and 24 will achieve even higher agitation and better smooth flow. In production of molded products, in particular, with a reactive liquid blend that is uniformly mixed and agitated being supplied throughout the whole discharging process from the start to the end, defects such as underfill or bottom lift-up of the molded products can be reduced. Furthermore, since at least two fine holes 30 are respectively arranged along the vertical direction of the chamber, at least one atomized component material 5a spreads out in the horizontal direction relative to the vertical direction of the chamber after the impingement with the other component material 5b, so that the atomized component materials 5a and 5b can be prevented from adhering on the push-out side of the piston 2 positioned at the ceiling of the chamber interior 10, and the mixing and contact efficiency of both component materials 5a and 5b can further be enhanced.

Embodiment 2

Figure 12:
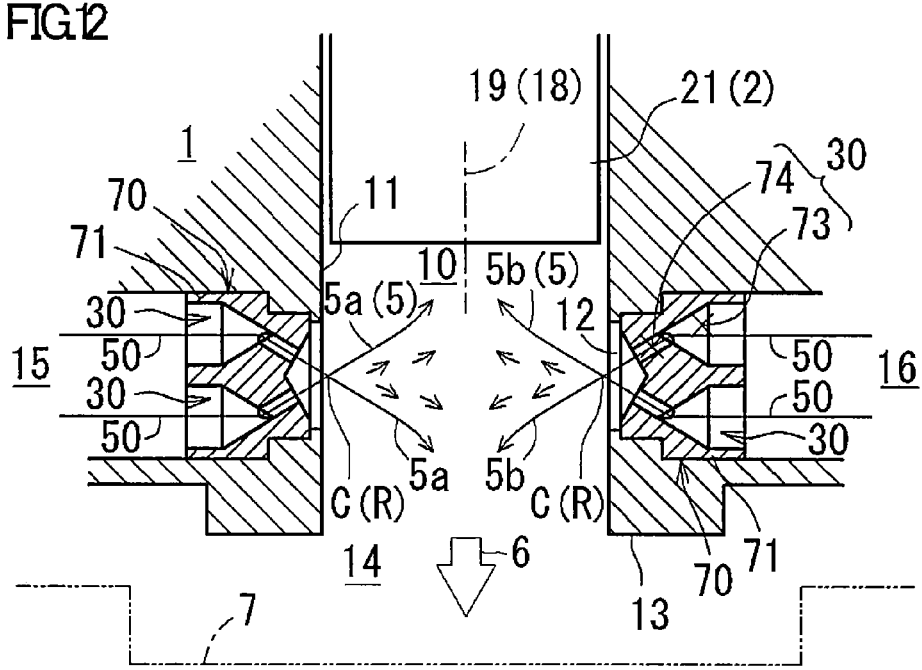
FIG. 12 is a schematic longitudinal sectional view showing a lower part of a mixing head apparatus in another aspect of the present invention.
Figure 13:
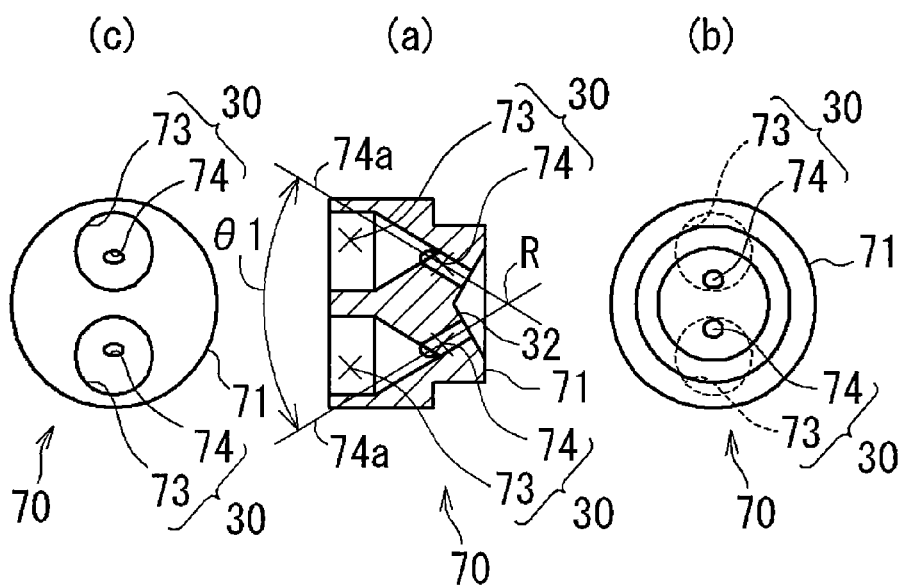
FIG. 13(a) is a longitudinal sectional view of a nozzle part of FIG. 12.
FIG. 13(b) is a right side view of FIG. 13(a)
FIG. 13(c) is a left side view of FIG. 13(a).
Figure 14:
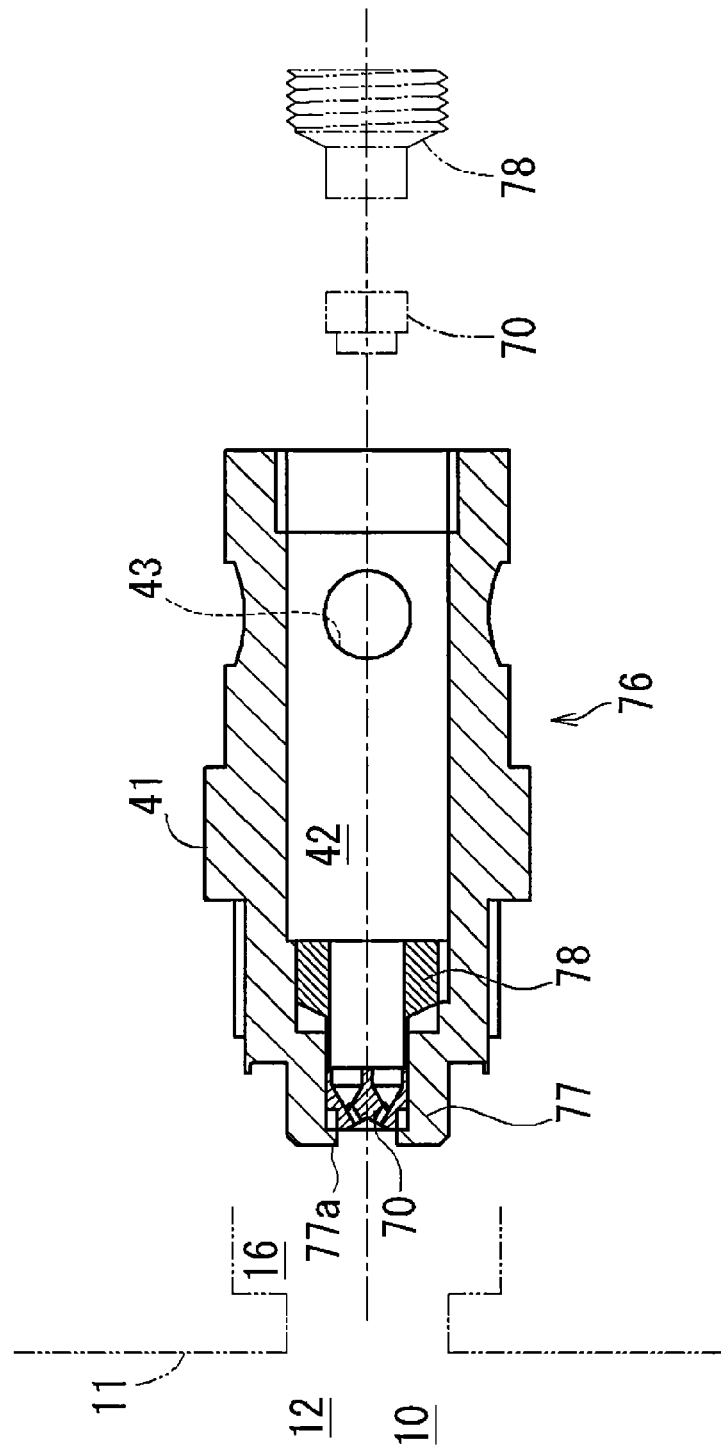
FIG. 14 is an exploded illustrative view showing how the nozzle part and a nozzle holder are mounted to a wall hole in the chamber of FIG. 12.
Figure 15:
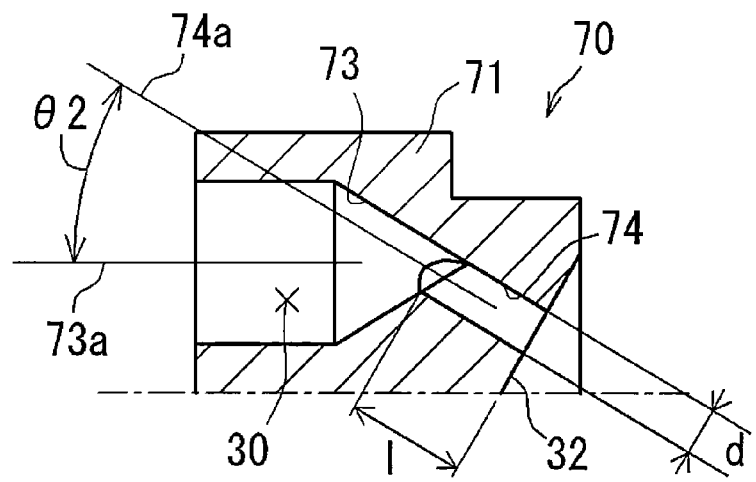
FIG. 15 is a partial enlarged view of the nozzle part of FIG. 13(a).
Figure 16:
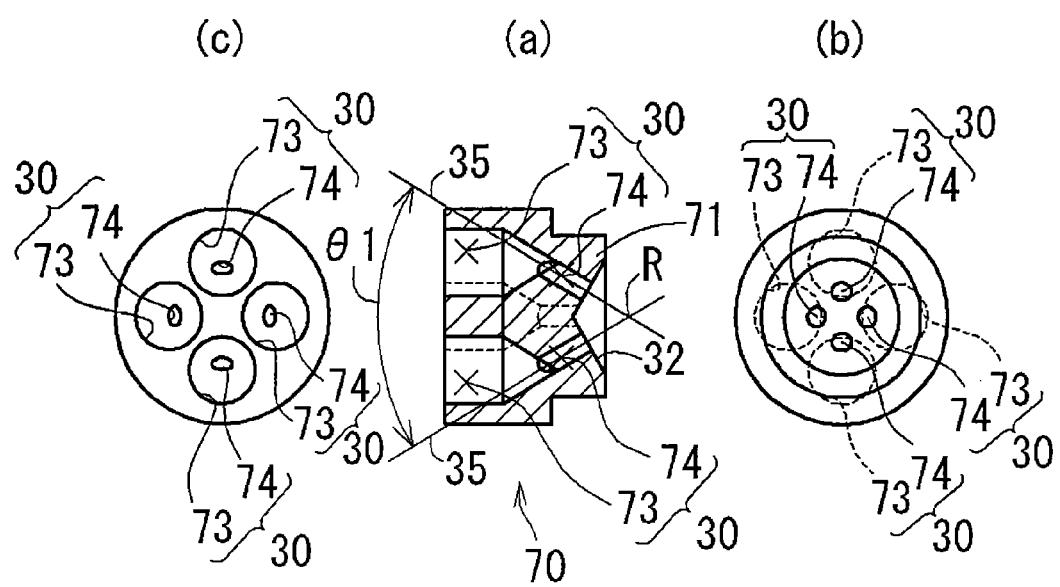
FIG. 16(a) is a longitudinal sectional view of a nozzle part in a different aspect from the nozzle part of FIG. 13.
FIG. 16(b) is a right side view of FIG. 16(a)
FIG. 16(c) is a left side view of FIG. 16(a).
Figure 17:
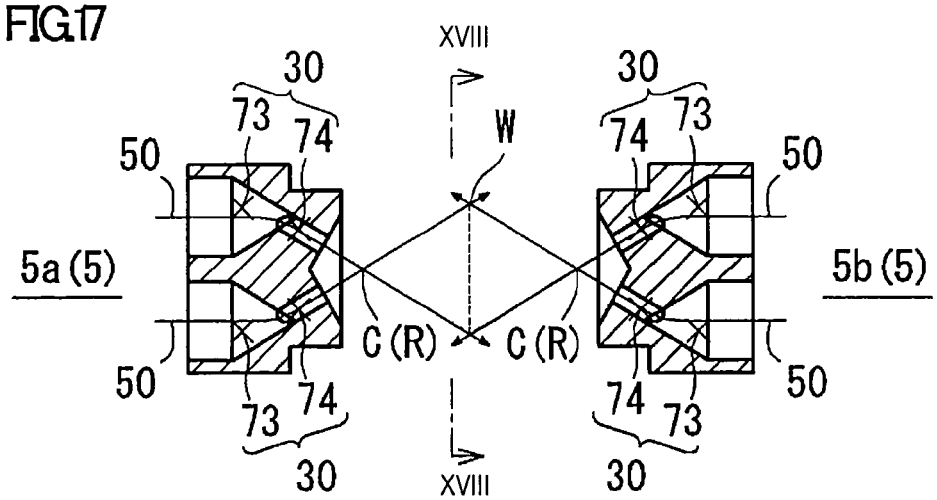
FIG. 17 is an illustrative view showing the positional relationship between nozzle parts mounted to opposite side walls of the chamber of the mixing head apparatus.
Figure 18:
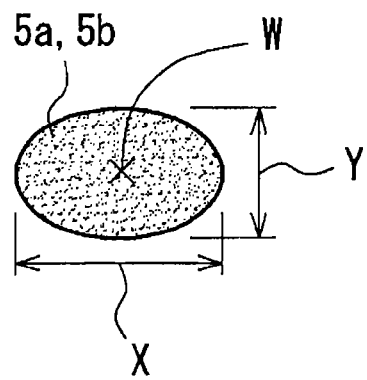
FIG. 18 is a diagram viewed from the direction of arrows along the line XVIII-XVIII of FIG. 17, showing an approximate shape of an impingement surface formed when jets of both component materials expelled from fine holes of the nozzle parts of FIG. 17 impinge on each other.
Figure 19:
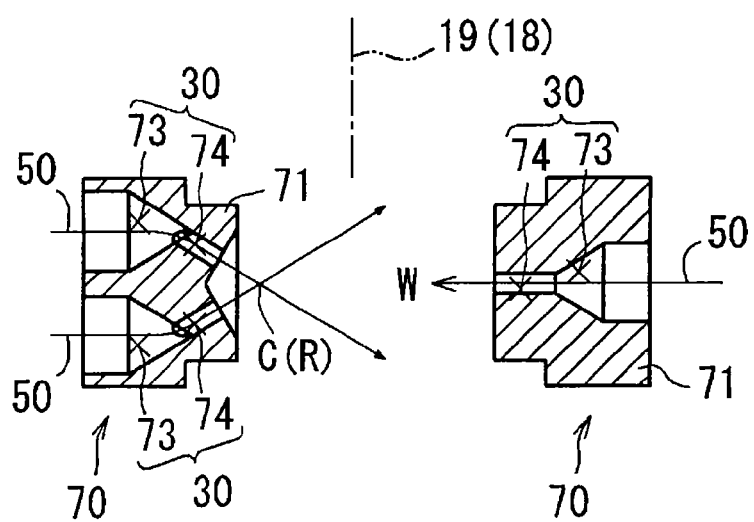
FIG. 19 is an illustrative view showing the positional relationship between nozzle parts mounted to opposite side walls of the chamber of a mixing apparatus, in a different aspect from that of FIG. 17.

Embodiment 2 of a mixing head apparatus and a molding method using the same according to the present invention will be hereinafter described in detail. FIGS. 12 to 19 illustrate one aspect of the mixing head apparatus (hereinafter referred to as "mixing apparatus") and the molding method using the same according to the present invention. FIG. 12 is a schematic longitudinal sectional view showing a lower part of the mixing apparatus, FIG. 13(a) is a longitudinal sectional view of a nozzle part of FIG. 12, FIG. 13(b) is a right side view of FIG. 13(a), and FIG. 13(c) is a left side view of FIG. 13(a). FIG. 14 is an exploded illustrative view showing how the nozzle part and a nozzle holder are mounted to a wall hole in the chamber of FIG. 12, FIG. 15 is a partial enlarged view of the nozzle part of FIG. 13(a), FIG. 16 shows a longitudinal sectional view (a), a right side view (b), and a left side view (c) of a nozzle part in a different aspect from the nozzle part of FIG. 13, FIG. 17 is an illustrative view showing the positional relationship between nozzle parts mounted to opposite side walls of the chamber of the mixing apparatus, FIG. 18 is a diagram viewed from the direction of arrows along the line XVIII-XVIII of FIG. 17, showing an approximate shape of an impingement surface formed when jets of both component materials expelled from fine holes of the nozzle parts of FIG. 17 impinge on each other. FIG. 19 is an illustrative view showing the positional relationship between nozzle parts mounted to opposite side walls of the chamber of a mixing apparatus, in a different aspect from that of FIG. 17. In the configuration of Embodiment 2, the same constituent parts as those of previously described Embodiment 1 are given the same reference numerals.

The basic structure of the mixing apparatus of the present invention is substantially the same as that of the conventional mixing apparatus shown in FIGS. 21 and 22. It is a mixing apparatus, in which one 5a and the other 5b of two types of chemically reactive fluid component materials 5 are expelled into a chamber interior 10 from fine holes 30 respectively provided in opposite side walls 11 of the chamber 1 so that both component materials 5a and 5b impinge on and mix with each other. Typically, such a high-pressure mixing apparatus does not depend on cleaning with a solvent and instead employ a mechanical cleaning method using an injection piston 2 such as the one shown in FIG. 21. FIG. 12 corresponds to an enlarged longitudinal sectional view of a lower part of the mixing apparatus of FIG. 21, and similarly to FIG. 21, an injection piston 2 is provided. A liquid blend 6 obtained through impingement and mixture of both component materials 5a and 5b in the chamber interior 10 is discharged from a discharge port 14 into a mold 7, after which the piston 2 moves up and down so that the inner walls 11 of the chamber after the impingement and mixture of both component materials 5a and 5b are cleaned by a rod 21 of the injection piston 2.

It should be pointed out here that, in the conventional mixing apparatus, when mixing both component materials 5a and 5b by expelling them from the fine holes 30, to achieve a higher degree of mixing, the speed of jets of both component materials 5a and 5b was increased to impart high energy so that the components impinge on one another and are thereby agitated and mixed together. To increase the speed and to impart high energy, the conventional mixing apparatus would have one each fine hole 30 for one component material and for the other component material, respectively provided in the opposite side walls 11 of the chamber 1. The mixing apparatus of FIGS. 21 and 22 with nozzle outlets 80 for fine holes, or the mixing apparatuses of FIGS. 23 and 24 respectively had one each nozzle outlet 80 for one component material and for the other component material provided in the opposite side walls. The intention was to expel both component materials from both nozzle outlets 80 with high energy at high pressure by plungers or the like so that they impinge on one another and are agitated and mixed together.

In this regard, in order to achieve a smooth flow of liquid blend 6 and better mixing performance, the present inventors looked at the issue from a different point of view and conceived of a possibility of improving the degree of mixing by planar impingement rather than point impingement as shown in FIGS. 21 to 24 of both plastic materials 5a and 5b when mixing two types of chemically reactive component materials 5 by impingement, and endeavored to develop a technique. Furthermore, the inventors conceived of a possibility of preventing nozzle clogging, in expelling fluid component materials 5 from fine holes 30, by configuring the fine holes 30 primarily with smooth curved surfaces where fluid traps are hardly formed for example as shown in FIG. 15 so that any foreign substance that may be formed such as polyurethane residue can be smoothly flushed out while it is still minute, and endeavored to develop a technique. These eventually led to the mixing apparatus and molding method using the same of the present invention.

In this mixing apparatus, a plurality ranging from two to four of fine holes 30 are provided for at least one of both component materials 5a and 5b. Center axis lines 74a at distal ends of two or more of these two to four fine holes 30 intersect with each other in the chamber interior 10. That is, center axis lines 74a of two, three, or four fine holes 30 intersect with each other in the chamber interior 10. The center axis lines 74a are set such that jets of one component material 5a expelled from the fine holes 30 with intersecting center axis lines 74a intersect and impinge on each other in the chamber interior 10 prior to the impingement with the other component material 5b. Also, the intersecting point R of the center axis lines 74a of two or more of the two to four fine holes 30 in the chamber interior 10 is set closer to a chamber inner wall 11 on the side of these fine holes 30 relative to the center of the chamber 1 in plan view or side view, so as to ensure the self impingement in the chamber interior 10 prior to the impingement with the other component material 5. Intersection and self impingement of one component material 5 in the chamber interior 10 prior to the impingement with the other component material 5 transform the one component material 5 into a dispersed state (atomized state). With at least one component material 5 impinging on the other component material 5 after transforming into the dispersed state in which it is spread out in a planar manner, the degree of mixing and contact efficiency of both component materials 5a and 5b expelled from opposite directions in the chamber interior 10 are significantly increased. At the same time, with an increase in the degree of mixing of both component materials 5a and 5b, the component materials 5 lose energy so that a smooth flow of liquid blend 6 is achieved.

The reason for setting the limitation that "a plurality ranging from two to four of fine holes 30 are provided" is that, providing more than four fine holes 30 would necessitate reducing their diameter, which would proportionally increase the possibility of impurities or aggregates clogging the nozzle. A preferable number of fine holes 30 provided for each component material is two. For example, the phrase "center axis lines 74a at distal ends of two fine holes 30 intersecting with each other in the chamber interior 10", which falls within the definition of "center axis lines 74a at distal ends of two or more of these two to four fine holes 30 intersecting with each other in the chamber interior 10" of the statement above of the present invention, should be understood to include not only the center axis lines 74a at distal ends of two fine holes 30 definitely intersecting with each other within a geometrical three-dimensional space, but also the center axis lines 74a slightly offsetting and not intersecting with each other in the chamber interior 10. If the jets of a component material 5 expelled from two fine holes 30 intersect with each other and substantially impinge on each other, the center axis lines 74a of the two fine holes 30 are interpreted as intersecting with each other in the chamber interior 10. Fluid component materials 5 contain high-viscosity plastic materials expelled from fine holes 30, which form thin, linear streams or beams, but if the jets 50 of both component materials 5a and 5b intersect and impinge on each other, they provide similar effects as those described above. The degree of mixing of both component materials 5a and 5b will then be increased, i.e., high agitation and a smooth flow will both be achieved.

More specifically, while both component materials 5a and 5b were impinged on one another at a point in the conventional apparatuses of FIGS. 21 to 24, two fine holes 30 are provided, for example, for at least one component material, and the center axis lines 74a of these two fine holes 30 are intersected with each other in the chamber interior 10, so that two jets 50 of one component material expelled from both fine holes 30 intersect and impinge on each other in the chamber interior 10 prior to the impingement with the other component material 5. Thereby, one component material 5 is spread out in a planar manner at a point where the other component material 5 impinges thereon so that a high degree of mixing is achieved. If a plurality ranging from two to four of fine holes 30 are provided for both component materials 5, and further, if center axis lines 74a at distal ends of at least two of the plurality of fine holes 30 are intersected with each other in the chamber interior 10, both component materials 5 will be spread out in a planar manner at the point of impingement between both component materials 5a and 5b, whereby even a higher degree of mixing will be achieved. If the two types of chemically reactive component materials 5a and 5b are component materials containing a polyol component and an isocyanate component for a two-component polyurethane plastic, the fine hole 30 for the component material containing an isocyanate component only may be provided in plurality ranging from two to four. Even only with plural fine holes 30 for the isocyanate component, an equally high degree of mixing can be achieved as would be if fine holes 30 for both component materials were provided in plurality ranging from two to four.

The nozzle part 70 according to this Embodiment 2 is formed of a stepped disk-like main part 71 provided with two fine holes 30 extending from the front side facing the chamber interior 10 through to the opposite backside, as shown in FIG. 13. These fine holes 30 respectively include a conical hole portion 73 opening on a material inlet side of the main part 71 and extending toward the chamber interior 10 in a tapered manner, and a distal end hole portion 74 extending from a tapered end of this conical hole portion 73 toward the chamber interior 10 and opening to the chamber interior 10. The conical hole portion 73 is configured with a cylindrical hole continuous with the bottom side of the conical hole. The distal end hole portion 74 is configured as a through hole extending straight to have a uniform circular cross section. With these conical hole portion 73 and distal end hole portion 74, the fine hole 30 is configured entirely by a curved surface where fluid traps are hardly formed. The distal end hole portion 74 is positioned as an extension of one diagonal side of the conical hole portion 73 so that its center axis line 74a is parallel to that one diagonal side. The respective center axis lines 73a and 74a of these conical hole portion 73 and distal end hole portion 74 intersect with each other with an internal crossing angle θ2 being within a range from 15 to 45° (see FIG. 15). The center axis lines 74a of respective distal end hole portions 74 of the fine holes 30 intersect with each other with an internal crossing angle θ1 being within a range from 30 to 90°. Further, both distal end hole portions 74 are disposed such that intersecting points R of the center axis lines 74a of both distal end hole portions 74 in the chamber interior 10 are set closer to inner walls 11 of the chamber on the side of these distal end hole portions 74 than to the center (here, center axis 19) of the chamber 1 in side view as shown in FIG. 12 (or in plan view). The length l of the axial holes is determined so as to achieve straightness in the jets 50 of component materials 5 expelled from the distal end hole portions 74, and the diameter d of the distal end hole portions 74 is set so as to achieve a necessary speed of the jets 50 (see FIGS. 12 and 15). In this embodiment, a conical recess 32 is provided on the front side of the nozzle part 70, and two distal end hole portions 74 are provided such as to extend perpendicularly from the surface of this recess through to the backside and to be spaced apart a predetermined distance in the up and down direction (i.e., vertical direction of the chamber or discharging direction of the liquid blend 6), so as to satisfy the two requirements mentioned above of straightness and necessary speed of the jets 50.

The nozzle part 70 is inserted into a tubular nozzle holder 76 from behind as shown in FIG. 14 and abutted on a flange 77a of a distal cylindrical portion 77 of the nozzle holder 76. A nozzle press 78 inserted from behind and screwed into the nozzle holder 76 presses the rear end face of the nozzle part 70 to mount it in position inside the distal cylindrical portion 77. This nozzle holder 76 with the nozzle part 70 mounted therein is securely screwed to the inner wall 11 around the wall hole 12. In this secured state, the component material 5 travels through the conduit 16 and a through hole 42 from an inlet 43 of the nozzle holder 76 toward the tip thereof so that jets 50 of the component material 5 are expelled into the chamber interior 10 from the fine holes 30 of the nozzle part 70.

FIG. 16 shows a nozzle part 70 in a different aspect from the nozzle part 70 provided with two fine holes 30 as shown in FIGS. 12 to 14. The nozzle part 70 of FIG. 16 includes two more fine holes 30 spaced apart a predetermined distance in the horizontal left and right direction in addition to the two fine holes 30 spaced apart a predetermined distance in the up and down direction of the nozzle part 70 of FIG. 13. The nozzle part 70 is therefore provided with four fine holes 30 with an interval of 90° in the recessed surface around the conical top of the conical recess 32. Although not shown, in the case with three fine holes 30, the nozzle part 70 will have three fine holes 30 provided with an interval of 120° in the recessed surface around the conical top of the conical recess 32.

The nozzle part 70, if it is the one shown in FIG. 13, for example, is attached to the wall hole 12 of the chamber 1 as shown in FIGS. 12 and 17 with the two fine holes 30 positioned up and down. With the two fine holes 30 being attached along the up and down direction, both component materials 5a and 5b spread out in a planar manner and impinge on each other after their self impingement. The impingement surface takes an oval shape as shown in FIG. 18. This oval shape has a longer horizontal length X than its vertical length Y. With the two fine holes 30 oriented in the up and down direction, it is easier to prevent atomized component materials 5a and 5b from adhering on the head of the piston (see FIG. 12) positioned at the ceiling of the chamber interior 10, than with the two fine holes being oriented in the horizontal direction.

Next, the molding method using this mixing apparatus will be described. The mixing apparatus used here is a mixing apparatus wherein one 5a and the other 5b of two types of chemically reactive fluid component materials 5a and 5b are expelled into a chamber interior 10 from fine holes 30 respectively provided in side walls 11 of the chamber so that both component materials 5a and 5b impinge on and mix with each other, a plurality ranging from two to four of fine holes being provided for at least one of both component materials 5a and 5b, center axis lines 74a at distal ends of two or more of these two to four fine holes 30 intersecting with each other inside the chamber interior 10, so that jets 50 of the component material 5a expelled from the fine holes 30 with intersecting center axis lines 74a impinge on each other in the chamber interior 10. The molding is performed using this mixing apparatus, wherein jets of one 5a of both component materials 5a and 5b are impinged on each other, followed by impingement with the other component material 5b so as to mix both component materials 5a and 5b, after which they are discharged into a mold 7 and cured. If the fine holes 30 are configured to include a conical hole portion 73 opening to an outer side of the side wall 11 of the chamber (i.e., opposite side of the chamber interior 10) and extending toward the chamber interior 10 in a tapered manner, and a distal end hole portion 74 extending from the tapered end of this conical hole portion 73 toward the chamber interior 10 and opening to the chamber interior 10, the fine holes 30 can be primarily configured by smooth curved surfaces with these conical hole portion 73 and tapered end fine hole portion 74 where fluid traps are hardly formed, so that any foreign substance that may be formed such as polyurethane residue can be smoothly flushed out while it is still minute and nozzle clogging can be prevented. If the two types of chemically reactive component materials 5 are component materials containing a polyol component and an isocyanate component for a two-component polyurethane plastic, then high agitation of a liquid blend 6 is achieved and the smooth flow of the liquid blend 6 from the discharge port 14 is improved by using this mixing apparatus, whereby high-quality molded products can be manufactured. If the intersecting point R of the center axis lines 74a at distal ends of two or more of the two to four fine holes 30 in the chamber interior 10 is set closer to the inner wall 11 of the chamber on the side of these fine holes than to the center of the chamber in plan view or side view, the high agitation and smooth flow of the liquid blend 6 can be accomplished with a higher precision, which is more preferable in producing high-quality molded products. The wall holes 12 in the side walls 11 of the chamber may be considered as the chamber interior 10, and the intersecting points R of the center axis lines 74a may be positioned in the wall holes 12. Further, if at least two fine holes 30 are respectively arranged along the vertical direction of the chamber, then at least one atomized component material 5a spreads out in the horizontal direction relative to the vertical direction of the chamber 10 after the impingement with the other component material 5b, so that the atomized component materials can be prevented from adhering on the push-out side of the piston 2 positioned at the ceiling of the chamber interior 10.

Performance comparison tests were conducted using these mixing apparatuses according to the above Embodiments 1 and 2, with favorable results, which will be described hereinafter.

[Performance Comparison Test]

Table 2 summarizes the results of an experiment using the mixing apparatus according to an example and a mixing device of a comparative example. In the example, using the nozzle part 70 (see FIG. 13) having the conical hole portion 73 and distal end hole portion 74, the bottom lift-up defect rate per 5000 of a test piece 1 and a test piece 2 was determined by touching, and the void occurrence rate per 5000 of a test piece 1 and a test piece 2 was determined by touching. In the comparative example, using a conventional one-hole nozzle part (not shown), the bottom lift-up defect rate per 5000 of a test piece 1 and a test piece 2 was determined by touching, and the void occurrence rate per 5000 of a test piece 1 and a test piece 2 was determined by touching. The test pieces 1 and 2 had dimensions of 250×150×200 mm. The test piece 1 was obtained by injecting a reactive urethane liquid blend into a mold lined with a skin material, and foaming and curing the urethane inside the skin material. The test piece 2 was obtained by directly injecting a reactive urethane liquid blend into a mold and foaming and curing the urethane on the surface of the mold. The injector used was a mass production machine, and the quality inspection items used were of the same standard as those for mass-produced products.

The results were that the test pieces 1 and 2 obtained using the nozzle part 70 of the example showed low values in all the items of void defect rate and bottom lift-up rate, as compared to the comparative example.

Furthermore, using the test piece 1, the number of times the line stopped during three months was determined. With a mass production machine, the line is stopped when a pressure sensor mounted to a flow path pipe in which material flows detects a high pressure in the material flow and the machine stops operating. The chamber was disassembled and nozzle clogging was confirmed every time the mass production machine was stopped. With the nozzle part 3 (see FIG. 2), the line was stopped nineteen times. With the nozzle part 70 (see FIG. 13), on the other hand, the line was stopped twice. It was ascertained that the line was stopped fewer times due to nozzle clogging with the nozzle part 70 than with the nozzle part 3.

TABLE 2

|  | Example Nozzle part 70 (see FIG. 13) | Comparative Example Conventional one-hole nozzle |
|---|---|---|
| Test Piece 1 |  |  |
| (void defect rate (%)) | 0.02 | 0.04 |
| (bottom lift-up defect rate (%)) | 0.11 | 0.64 |
| Test Piece 2 |  |  |
| (void defect rate (%)) | 0.05 | 0.13 |
| (bottom lift-up defect rate (%)) | 0.02 | 0.62 |

The mixing apparatus thus configured and the molding method using the same are very useful since high agitation of the liquid blend 6 and improvement in the smooth flow of the liquid blend 6 from the discharge port 14 are achieved only by providing a plurality ranging from two to four of fine holes 30 for at least one of both component materials 5a and 5b and by setting the center axis lines 74a at distal ends of at least two of the plurality of fine holes 30 to intersect with each other in the chamber interior 10. Because of the simplicity of this structure, the apparatus cost can be significantly reduced as compared to conventional apparatuses shown in FIGS. 14 and 15. Even with an existing mixing apparatus, high agitation of the liquid blend 6 and improvement in the smooth flow of the liquid blend 6 from the discharge port 14 can be achieved easily only by replacing the nozzle member 8 with this nozzle part 70 which is interchangeable therewith. In addition, the apparatus is excellent in productivity as it does not involve redundant operation steps of the reciprocating baffle pins 91 or cleaning member 92 of FIGS. 14 and 15. It goes without saying that the configuration of the present invention added to the conventional apparatuses of FIGS. 15 and 16 will achieve even higher agitation and better smooth flow. In production of molded products, in particular, with a reactive liquid blend that is uniformly mixed and agitated being supplied throughout the whole discharging process from the start to the end, defects such as underfill or bottom lift-up of the molded products can be reduced. Further, since the fine holes 30 are configured to include a conical hole portion 73 opening to an outer side of the side wall 11 of the chamber and extending toward the chamber interior 10 in a tapered manner, and a distal end hole portion 74 extending from the tapered end of this conical hole portion 73 toward the chamber interior 10 and opening to the chamber interior 10, the fine holes 30 can be primarily configured by smooth curved surfaces with these conical hole portion 73 and distal end hole portion 74 where fluid traps are hardly formed, so that any foreign substance that may be formed such as polyurethane residue can be smoothly flushed out while it is still minute and nozzle clogging can be prevented, whereby the mixing and contact efficiency of both component materials 5a and 5b can further be enhanced. Furthermore, since at least two fine holes 30 are respectively arranged along the vertical direction of the chamber 10, at least one atomized component material 5a spreads out in the horizontal direction relative to the vertical direction of the chamber after the impingement with the other component material 5b, so that the atomized component materials 5a and 5b can be prevented from adhering on the push-out side of the piston 2 positioned at the ceiling of the chamber 10, and the mixing and contact efficiency of both component materials 5a and 5b can further be enhanced.

The present invention is not limited to the above-described examples, and may be variously changed in accordance with the purposes and applications without departing from its scope. The shape, size, and number of the chamber 1, injection piston 2, nozzle part 3 (70), nozzle holder 4 (76), and mold 7 and the like may be suitably selected in accordance with the applications. For example, other than two types of chemically reactive fluid component materials expelled into the chamber interior 10 from fine holes 30 respectively provided in side walls 11 of the chamber, additives such as bubble regulators, catalysts that do not contribute to the reaction may be expelled into the chamber interior 10 from fine holes different from the fine holes 3 for the two types of component materials. Such a case is also considered to be within the scope of the present invention, if a plurality ranging from two to four of fine holes 30 are provided for at least one of both component materials and the center axis lines 74a of two or more of the two to four fine holes 30 intersect with each other in the chamber interior 10, so that jets 50 of the component material expelled from the fine holes 30 with intersecting center axis lines impinge on each other in the chamber interior 10 prior to the impingement with the other component material.

Figure 20:
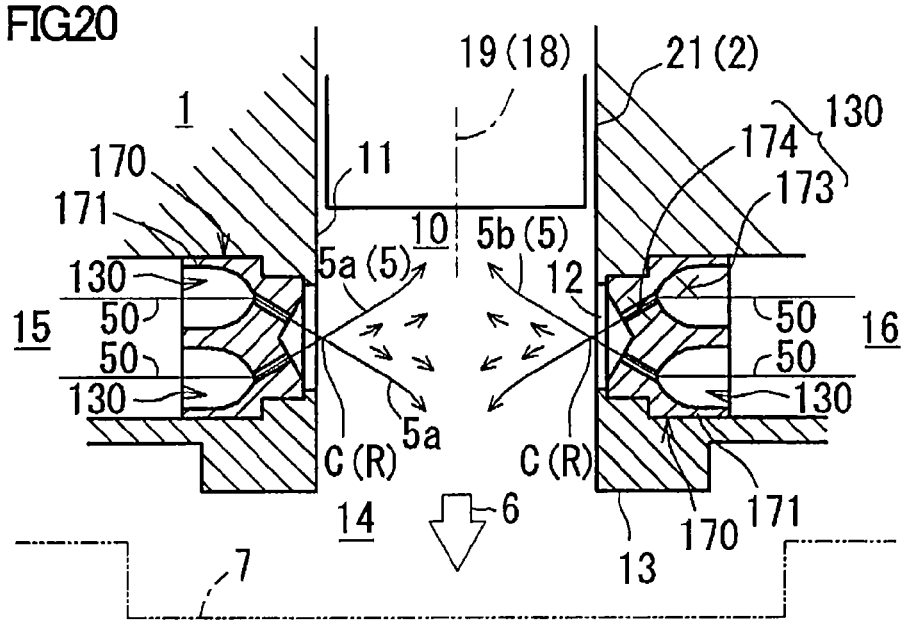
FIG. 20 is a schematic longitudinal sectional view showing a lower part of a mixing head apparatus in yet another aspect of the present invention.

While the fine hole 30 of the nozzle part 70 illustrated in the above-described example was configured entirely by a curved surface where fluid traps are hardly formed, the invention is not limited to this. For example, a flat surface may exist in part of the fine hole of the nozzle part, as long as a foreign substance such as polyurethane residue can be smoothly flushed out. Also, while the fine hole 30 of the nozzle part 70 illustrated in the above-described example included a conical hole portion 73 having a conical hole and a distal end hole portion 74 (see FIG. 12), the invention is not limited to this. For example, as shown in FIG. 20, the nozzle part 170 may have fine holes 130 having a half-cut spindle-shaped conical hole portion 173 and a distal end hole portion 174, or the nozzle part may have fine holes having a funnel-shaped conical hole portion and a distal end hole portion. Also, while the conical hole portion 73 illustrated in the above-described example was a combination of a conical hole (or a half-cut spindle-shaped hole, funnel-shaped hole, or the like) and a cylindrical hole, the invention is not limited to this. For example, the conical hole portion may be formed of a single conical hole, half-cut spindle-shaped hole, funnel-shaped hole, or the like. Further, while the distal end hole portion 74 of the nozzle part 70 illustrated in the above-described example was a through hole that is circular in a longitudinal cross section, the invention is not limited to this, and it may be, for example, formed of a through hole being oval in a longitudinal cross section.

One reference example of a mixing head apparatus would be, for example, a mixing head apparatus in which two types of chemically reactive fluid component materials are expelled into a chamber interior from fine holes respectively provided in side walls of the chamber so that both component materials impinge on and mix with each other, wherein a nozzle part is detachably secured to a wall hole portion provided in a side wall of the chamber, the nozzle part being formed with the fine holes, the fine holes including a conical hole portion opening on a material inlet side of the nozzle part and tapering toward the chamber interior, and a distal end hole portion extending from a tapered end of the conical hole portion toward the chamber interior and opening to the chamber interior.

The invention claimed is:

1. A mixing head apparatus, wherein:
   two chemically reactive fluid component materials are expelled into a chamber interior of the mixing head apparatus from fine holes respectively provided in side walls of a chamber so that both component materials impinge on and mix with each other,
   a plurality ranging from two to four of fine holes are provided for at least one component material and center axis lines at distal ends of two or more of these two to four fine holes intersect with each other in the chamber interior, so that jets of the at least one component material expelled from the fine holes with intersecting center axis lines impinge on each other in the chamber interior prior to impingement with another component material,
   a nozzle part formed with fine holes is detachably secured to a wall hole portion provided in a side wall of the chamber, and
   at least one of the fine holes includes a conical hole portion opening on a material inlet side of the nozzle part and tapering toward the chamber interior, and a distal end hole portion extending from a tapered end of the conical hole portion toward the chamber interior and opening to the chamber interior.

2. The mixing head apparatus according to claim 1, wherein the nozzle part is formed with two fine holes, center axis lines of both fine holes intersecting with each other with a crossing angle (θ) within a range of from 30 to 90°.

3. The mixing head apparatus according to claim 2, wherein the two fine holes are respectively disposed along a vertical direction of the chamber.

4. A molding method, comprising:
   expelling two chemically reactive fluid component materials into a chamber interior of a mixing head apparatus from fine holes respectively provided in side walls of a chamber, wherein
   jets of at least one component material expelled from a plurality ranging from two to four of fine holes impinge on each other in the chamber interior followed by impingement with another component material,
   center axis lines at distal ends of two or more of the plurality ranging from two to four of fine holes intersect with each other in the chamber interior; and
   at least one of the fine holes includes a conical hole portion tapering toward the chamber interior, and a distal end hole portion extending from a tapered end of the conical hole portion toward the chamber interior and opening to the chamber interior;
   mixing the two component materials together, thereby obtaining a mixture;
   discharging the mixture into a mold; and
   curing the mixture.

5. The molding method according to claim 4, wherein the two component materials comprise a polyol component and an isocyanate component for a two-component polyurethane resin.

6. The molding method according to claim 5, wherein the plurality ranging from two to four of fine holes are respectively disposed along a vertical direction of the chamber.

7. The molding method according to claim 4, wherein the plurality ranging from two to four of fine holes are respectively disposed along a vertical direction of the chamber.

* * * * *